(12) United States Patent
Huang et al.

(10) Patent No.: US 10,235,994 B2
(45) Date of Patent: Mar. 19, 2019

(54) MODULAR DEEP LEARNING MODEL

(71) Applicant: MICROSOFT TECHNOLOGY LICENSING, LLC, Redmond, WA (US)

(72) Inventors: Yan Huang, Redmond, WA (US); Chaojun Liu, Redmond, WA (US); Kshitiz Kumar, Redmond, WA (US); Kaustubh Prakash Kalgaonkar, Redmond, WA (US); Yifan Gong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/199,346

(22) Filed: Jun. 30, 2016

(65) Prior Publication Data

US 2017/0256254 A1 Sep. 7, 2017

Related U.S. Application Data

(60) Provisional application No. 62/304,133, filed on Mar. 4, 2016.

(51) Int. Cl.
*G06N 3/04* (2006.01)
*G10L 15/02* (2006.01)
(Continued)

(52) U.S. Cl.
CPC ............... *G10L 15/16* (2013.01); *G06N 3/04* (2013.01); *G10L 15/02* (2013.01); *G10L 15/063* (2013.01);
(Continued)

(58) Field of Classification Search
None
See application file for complete search history.

(56) References Cited

U.S. PATENT DOCUMENTS

| | | | | |
|---|---|---|---|---|
| 5,317,673 A | * | 5/1994 | Cohen | G10L 15/144 704/232 |
| 5,493,632 A | * | 2/1996 | Ahn | G06N 3/04 706/28 |

(Continued)

FOREIGN PATENT DOCUMENTS

| | | |
|---|---|---|
| CN | 103680496 A | 3/2014 |
| CN | 104538028 A | 4/2015 |

(Continued)

OTHER PUBLICATIONS

A. Waibel, "Modular Construction of Time-delay Neural Networks for Speech Recognition," Neural Computation, 1989. pp. 39-46.*
(Continued)

*Primary Examiner* — Fariba Sirjani
(74) *Attorney, Agent, or Firm* — Shook, Hardy & Bacon L.L.P.

(57) ABSTRACT

The technology described herein uses a modular model to process speech. A deep learning based acoustic model comprises a stack of different types of neural network layers. The sub-modules of a deep learning based acoustic model can be used to represent distinct non-phonetic acoustic factors, such as accent origins (e.g. native, non-native), speech channels (e.g. mobile, bluetooth, desktop etc.), speech application scenario (e.g. voice search, short message dictation etc.), and speaker variation (e.g. individual speakers or clustered speakers), etc. The technology described herein uses certain sub-modules in a first context and a second group of sub-modules in a second context.

20 Claims, 12 Drawing Sheets

(51) Int. Cl.
*G10L 15/06* (2013.01)
*G10L 15/16* (2006.01)
*G10L 15/28* (2013.01)
*G10L 15/065* (2013.01)
*G10L 15/183* (2013.01)

(52) U.S. Cl.
CPC .......... *G10L 15/065* (2013.01); *G10L 15/183* (2013.01); *G10L 15/28* (2013.01)

(56) References Cited

U.S. PATENT DOCUMENTS

| | | | | |
|---|---|---|---|---|
| 5,495,542 | A * | 2/1996 | Shimomura | G06N 3/04 382/156 |
| 5,581,659 | A * | 12/1996 | Takatori | G06N 3/08 706/19 |
| 5,845,049 | A * | 12/1998 | Wu | G06F 19/24 706/16 |
| 5,933,818 | A * | 8/1999 | Kasravi | G06K 9/622 706/12 |
| 6,088,739 | A * | 7/2000 | Pugh | G06F 9/4428 703/22 |
| 6,324,510 | B1 * | 11/2001 | Waibel | G10L 15/02 704/232 |
| 6,560,582 | B1 * | 5/2003 | Woodall | G06K 9/6267 706/15 |
| 6,574,613 | B1 * | 6/2003 | Moreno-Barragan | G01N 33/0034 706/16 |
| 7,319,959 | B1 * | 1/2008 | Watts | G10L 15/02 704/205 |
| 8,352,265 | B1 * | 1/2013 | Lin | G10L 15/142 704/256 |
| 8,463,610 | B1 * | 6/2013 | Bourke | G10L 15/285 704/231 |
| 8,639,510 | B1 * | 1/2014 | Yu | G10L 15/08 704/256 |
| 9,153,231 | B1 * | 10/2015 | Salvador | G10L 15/065 |
| 9,202,464 | B1 * | 12/2015 | Senior | G10L 15/063 |
| 9,324,320 | B1 * | 4/2016 | Stolcke | G10L 15/063 |
| 9,378,731 | B2 * | 6/2016 | Kapralova | G10L 15/063 |
| 9,401,148 | B2 * | 7/2016 | Lei | G10L 17/18 |
| 9,460,711 | B1 * | 10/2016 | Vanhoucke | G10L 15/16 |
| 9,466,292 | B1 * | 10/2016 | Lei | G10L 15/16 |
| 9,520,127 | B2 * | 12/2016 | Li | G10L 15/16 |
| 9,691,020 | B2 * | 6/2017 | Matsuda | G06N 3/08 |
| 9,721,097 | B1 * | 8/2017 | Davis | G06F 21/562 |
| 10,089,576 | B2 * | 10/2018 | Gao | G06N 3/08 |
| 2003/0061042 | A1 * | 3/2003 | Garudadri | G10L 15/30 704/254 |
| 2003/0105597 | A1 * | 6/2003 | Tsui | G06N 3/0454 702/20 |
| 2003/0125955 | A1 * | 7/2003 | Arnold | G10L 15/30 704/270.1 |
| 2004/0002930 | A1 * | 1/2004 | Oliver | G06K 9/6297 706/46 |
| 2006/0036559 | A1 * | 2/2006 | Nugent | G06N 3/08 706/23 |
| 2006/0218132 | A1 * | 9/2006 | Mukhin | G06F 17/30483 |
| 2006/0242098 | A1 * | 10/2006 | Wnek | G06F 17/30634 706/45 |
| 2009/0228416 | A1 * | 9/2009 | Nugent | B82Y 10/00 706/33 |
| 2011/0103577 | A1 * | 5/2011 | Poirier | G10L 15/26 379/420.03 |
| 2013/0132082 | A1 * | 5/2013 | Smaragdis | G10L 15/142 704/240 |
| 2013/0166279 | A1 * | 6/2013 | Dines | G10L 15/02 704/8 |
| 2013/0238329 | A1 * | 9/2013 | Casella dos Santos | G06F 19/3487 704/235 |
| 2014/0222425 | A1 * | 8/2014 | Park | G10L 15/24 704/243 |
| 2014/0257803 | A1 * | 9/2014 | Yu | G06N 3/0481 704/232 |
| 2014/0278390 | A1 * | 9/2014 | Kingsbury | G10L 15/1822 704/232 |
| 2015/0039299 | A1 * | 2/2015 | Weinstein | G10L 15/16 704/202 |
| 2015/0039543 | A1 * | 2/2015 | Athmanathan | H04L 63/1425 706/20 |
| 2015/0058982 | A1 * | 2/2015 | Eskin | G06F 17/30914 726/23 |
| 2015/0127327 | A1 * | 5/2015 | Bacchiani | G10L 25/30 704/202 |
| 2015/0127336 | A1 * | 5/2015 | Lei | G10L 17/18 704/232 |
| 2015/0269931 | A1 | 9/2015 | Senior et al. | |
| 2015/0269933 | A1 * | 9/2015 | Yu | G10L 15/16 704/232 |
| 2015/0324690 | A1 * | 11/2015 | Chilimbi | G06N 3/063 706/25 |
| 2016/0034811 | A1 * | 2/2016 | Paulik | G06N 3/0454 706/20 |
| 2016/0098646 | A1 * | 4/2016 | Gomez | G06N 3/0454 706/12 |
| 2016/0170982 | A1 * | 6/2016 | Djuric | G06N 3/0454 707/740 |
| 2016/0240215 | A1 * | 8/2016 | Suess | G10L 25/69 |
| 2016/0260428 | A1 * | 9/2016 | Matsuda | G06N 3/08 |
| 2016/0275414 | A1 * | 9/2016 | Towal | G06F 17/3028 |
| 2016/0284347 | A1 * | 9/2016 | Sainath | G10L 15/16 |
| 2016/0352907 | A1 * | 12/2016 | Raanani | H04M 3/5175 |
| 2017/0031934 | A1 * | 2/2017 | Snoek | G06F 17/3002 |
| 2017/0148429 | A1 * | 5/2017 | Hayakawa | G10L 15/02 |
| 2017/0161608 | A1 * | 6/2017 | Saon | G06N 3/08 |

FOREIGN PATENT DOCUMENTS

JP 2015102806 A 6/2015
WO 2015079885 A1 6/2015

OTHER PUBLICATIONS

J. Fritsch, M. Finke, A. Waibel, "Effective Structural Adaptation of LVCSR Systems to Unsen domains using hierarchical connectionist acoustic models," Proceedings of the International Conference on Spoken Language Processing, p. 2919-2922, (Nov. 30-Dec. 4, 1998).*

Paraskevi Raftopoulou and Euripides G.M. Petrakis, "iCluster: a Self-Organizing Overlay Network for P2P Information Retrieval", in proc. of ECIR, Mar. 30-Apr. 3, 2008.*

Mohamed, et al., "Acoustic Modeling using Deep Belief Networks", In Journal of IEEE Transactions on Audio, Speech, and Language Processing, vol. 20, Issue 1, Jan. 2012, pp. 1-10.

Hinton, et al., "Deep Neural Networks for Acoustic Modeling in Speech Recognition", In Proceedings of IEEE Signal Processing Magazine, vol. 26, Issue 6, Apr. 27, 2012, pp. 1-27.

Dejcroix et al., "Context Adaptive Deep Neural Networks for Fast Acoustic Model Adaptation", In Proceedings of IEEE International Conference on Acoustics, Speech and Signal Processing, Apr. 19, 2015, pp. 4535-4539.

Heigold, et al., "Multilingual Acoustic Models using Distributed Deep Neural Networks", In Proceedings of International Conference on Acoustics, Speech and Signal Processing, May 26, 2013, 5 Pages.

"International Search Report and Written Opinion Issued in PCT Application No. PCT/US2017/019599", dated Jun. 8, 2017, 12 Pages.

Ochiai, et al., "Speaker Adaptive Training using Deep Neural Networks", In Proceedings of IEEE International Conference on Acoustics, Speech and Signal Processing, May 4, 2014, pp. 6349-6353.

Yu, et al., "Factorized Deep Neural Networks for Adaptive Speech Recognition", In Proceedings of International Workshop on Statis-

(56) References Cited

OTHER PUBLICATIONS tical Machine Learning for Speech Processing, Mar. 31, 2012, 5 Pages.

* cited by examiner

MODULAR DEEP LEARNING MODEL

CROSS-REFERENCE

This application claims the benefit of U.S. Provisional Application No. 62/304,133, filed Mar. 4, 2016, the entirety of which is hereby incorporated by reference.

BACKGROUND

Automatic speech recognition (ASR) allows a computing device to understand human speech. Automatic speech recognition (ASR) can use language models for determining plausible word sequences for a given language using the result of an audio processing by an acoustic model as input. Understanding human speech enables voice-to-text transcription and voice commands, among other functions. In real world situations, speech need to be understood in a variety of acoustic environments. It is a challenge for a single acoustic model to accurately identify sounds across a plurality of environments and speakers.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The technology described herein can modularize a deep learning acoustic model that identifies acoustic units, or other linguistic units that make up speech, within the audio signal. The acoustic unit candidates output from the acoustic model together with the scores could then be processed by a language model that outputs a sequence of words that can enable human-to-computer interactions. Accordingly, the technology can be used to facilitate a computer-human interface controlled by the human voice. The interface can receive queries, dictation, voice commands, and input for other purposes.

A deep learning acoustic model comprises a stack of different types of neural network layers (e.g. fully connected layers, convolution layers, long short term memory cell layer) or their combination. The layers can be organized in a feed-forward or recurrent network structure. These layers are equivalently individual modules of the deep neural network, and can be referred to herein as sub-modules. The sub-modules of a deep learning based acoustic model can be used to represent distinct non-phonetic acoustic factors, such as accent origins (e.g. native, non-native), speech channels (e.g. mobile, bluetooth, desktop etc.), speech application scenario (e.g. voice search, short message dictation etc.), and speaker variation (e.g. individual speakers or clustered speakers), etc.

Along with existing sub-modules, the technology described herein can also insert additional neural network sub-modules and use them to parameterize and optimize the specific non-phonetic acoustic conditions. Overall, many of the neural network components are shared across acoustic conditions except a few specific sub-modules that are adapted to specific acoustic conditions.

The technology can be used for decoding in a speech engine, where the condition-specific sub-modules are swapped in and out of the model without introducing additional run-time search cost. The technology can be applied to a wide range of automatic speech recognition ("ASR") services using different types of deep learning based acoustic model, such as deep neural network ("DNN"), convolutional neural network ("CNN"), long short-term memory recursive neural network ("LSTM-RNN"), or a Convolutional, Long Short-Term Memory Deep Neural Network ("CL-DNN").

BRIEF DESCRIPTION OF THE DRAWINGS

Aspects of the technology are described in detail below with reference to the attached drawing figures, wherein.

DETAILED DESCRIPTION

Figure 1:
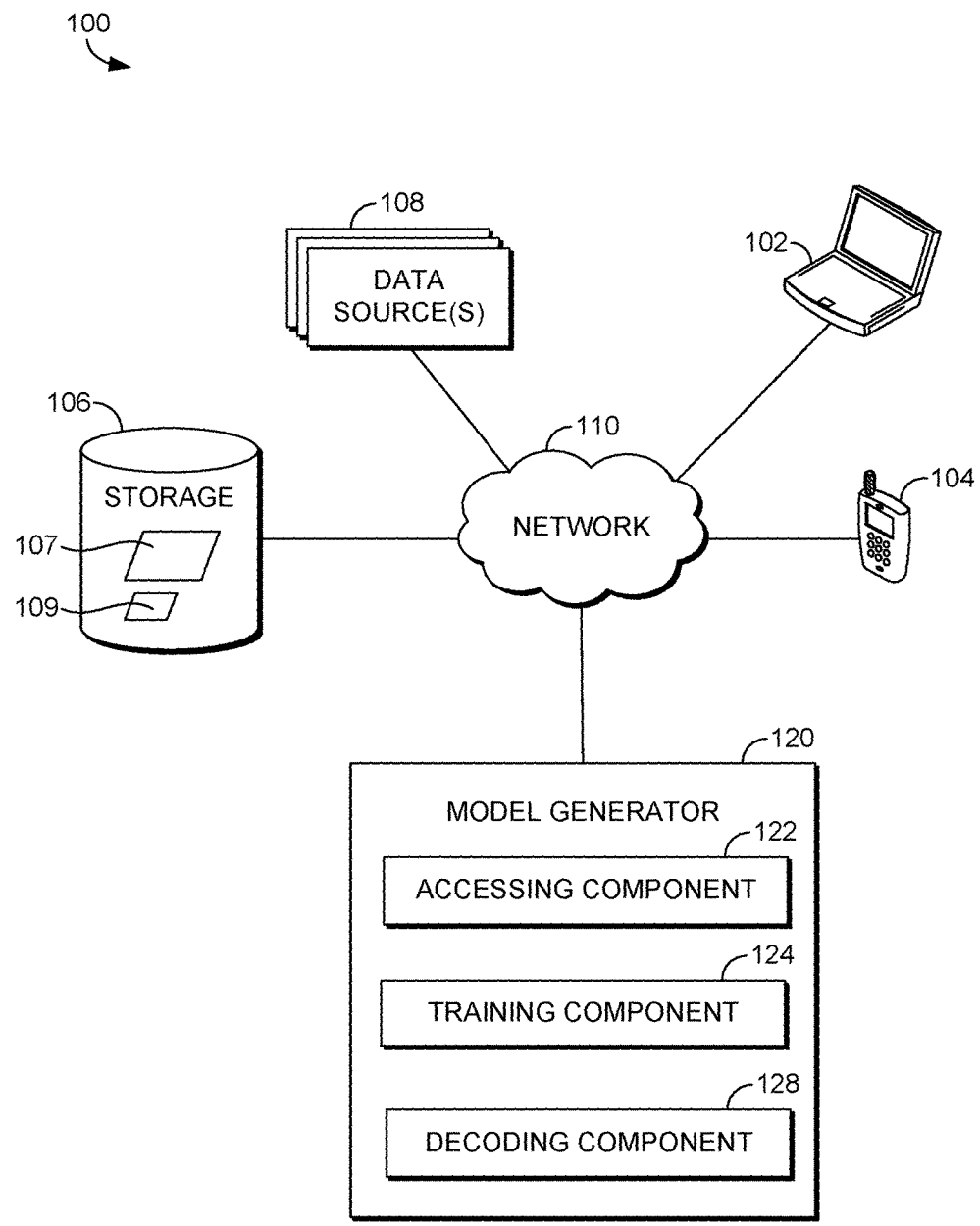
FIG. 1 is a block diagram of an exemplary computing environment suitable for generating and using a modular acoustic model, in accordance with an aspect of the technology described herein.

The subject matter of the technology described herein is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein can comprise a modular deep learning acoustic model that identifies acoustic units, or other linguistic units that make up speech, within the audio signal. The acoustic units could then be processed by a language model that converts the series of acoustic units into a sequence of words that can enable human-to-computer interactions. Accordingly, the technology can be used to facilitate a computer-human interface controlled by the human voice. The interface can receive queries, dictation, voice commands, and input for other purposes.

A technical problem with current acoustic models is enabling a single model to accurately process audio signals captured in a large number of different contexts. In general, a model that can handle a broad variety of contexts is less accurate than a model trained for a specific context when processing a signal that fits the specific context. Of course, a model trained for a specific context can perform poorly when attempting to process audio signals that do not match the specific context. Moreover, it is very difficult to train a separate acoustic model for each context due to data scarcity. The technology described herein builds a model with context specific sub-modules. The modular model can comprise layers that are used in all contexts and then combined with context specific sub-modules that are used in only specific contexts to produce a result. The sub-modules allow the model to adapt to the present context.

The context can be determined by analyzing the acoustic signals or other non-acoustic information. For example, the acoustic signal could be used to determine the likely gender of the speaker; the information about the geographic location could be used to determine the likely accent of the speaker. The identification information about the speaker could be used to initialize a modular model with sub-modules specially adapted to process speech matching these user characteristics. Using the special purpose sub-modules can improve the accuracy of the model.

"Context" in this document represents distinct non-phonetic acoustic factors in speech recognition. Context can be discrete or continuous signals in the format of a scalar or a vector. The context can be deterministic or non-deterministic. Examples of context are gender, accent origins (e.g. native, non-native), speech channels (e.g. mobile, bluetooth, desktop etc.), speech application scenario (e.g. voice search, short message dictation etc.), and speaker variation (e.g. individual speakers or clustered speakers), iCluster, sCluster, etc. The context-specific modules can correspond to each available context.

The modular model can be a deep learning based acoustic model. A deep learning based acoustic model comprises a stack of different types of neural network layers (e.g. fully connected layers, convolution layers, long short term memory cell layer) or their combination. The layers can be organized in a feed-forward or recurrent network structure. These layers are equivalently individual modules of the deep neural network, and can be referred to herein as sub-modules. The sub-modules of a deep learning based acoustic model can be used to represent distinct non-phonetic acoustic factors, such as accent origins (e.g. native, non-native), speech channels (e.g. mobile, bluetooth, desktop etc.), speech application scenario (e.g. voice search, short mes-sage dictation etc.), and speaker variation (e.g. individual speakers or clustered speakers), etc.

Along with existing sub-modules, the technology described herein can also insert additional neural network sub-modules and use them to parameterize and optimize the specific non-phonetic acoustic conditions. Overall, many of the neural network components are shared across acoustic conditions except a few specific sub-modules that are adapted to specific acoustic conditions.

The technology can be used for decoding in a speech engine, where the condition-specific sub-modules are swapped in and out of the model without introducing additional run-time search cost. The technology can be applied to a wide range of automatic speech recognition ("ASR") services using different types of deep learning based acoustic model, such as deep neural network ("DNN"), convolutional neural network ("CNN"), long short-term memory recursive neural network ("LSTM-RNN"), or a Convolutional, Long Short-Term Memory Deep Neural Network ("CL-DNN").

Specially trained sub-modules can be used to model multiple accents, channels, speech application scenarios, and different speakers within a single deep learning acoustic model and further improve the model robustness against a multi-style trained model. The modular model can include several different classes of sub-modules. A sub-module is a portion of the model (such as a layer) that is optimized to process an audio signal with a particular context. The context can include characteristics of a speaker, a device capturing the speaker, and other characteristics of the audio signal.

A controller can be provided that identifies the context and activates or deactivates different sub-modules within the modular model. For example, the controller could determine from context that the audio signal captures a female voice. The controller could activate a sub-module specially trained to process female voices, instead of a default sub-module, or a sub-module trained to process male voices. Different combinations of specialized sub-modules can be activated simultaneously. For example, a model could include a sub-module specialized for a female speaker with a specific accent attempting to dictate a message (a type of scenario).

In one aspect, the controller receives external signals to understand the context and initialize the relevant sub-modules. The external signals can be discrete or continuous. Discrete signals can define a context based on a one-time determination that is unlikely to change during the signal processing session. Discrete signals can include enumerative signals, such as gender (female, male etc.), scenario (voice search, short message dictation etc.), channel (mobile, Bluetooth, desktop etc.) etc. The discrete signals can be derived from user profile information, device context, signal analysis, etc.

The discrete signals can also include clustered signals derived from unsupervised clustering of a vector-space representation of acoustic context. For example, iCluster is a type of speech clustering information based on iVector representation. iVector maps the variable length speech signal to a fixed length vector via factor analysis in the total variability space. The variability space is defined by the total variability matrix that contains the eigenvectors with the largest eigenvalues of the total variability covariance matrix. The iVector speech representation contains multiple variabilities of the speech signal, such as speaker, channel, etc. sCluster is another type of speech clustering information based on a representation derived from a speakerID neural network. In this representation, the acoustic context is represented by the bottleneck layer of a speakerID neural network.

In addition to the discrete signals, continuous signals can be monitored to determine the context. The continuous signals can be either scalar signals or vector signals. The scalar signals can be a single value, such as an integer. The vector signals can comprise multiple variables, each with an assigned value.

As an alternative to discrete or continuous signals, the external signals can be alternatively classified into deterministic or non-deterministic. As the deterministic signal is available before recognizing the utterance, sub-modules can be applied in the 1st-pass decoding. The signal can be obtained through user or system setting (user check non-native box, user check male/female box; system set microphone type, bluetooth connection, modularization user ID (MUID), location, etc.). The deterministic signal can also be inferred. For example, a detected location change at 60 mile/hr can be used to infer a driving mode. A name/phonebook/search history can be used to infer a gender/age. A GPS data signal can be used to activate a location dependent sub-module.

The signal can also be processed using a nondeterministic algorithm. A nondeterministic algorithm is an algorithm that, even for the same input, can exhibit different behaviors on different runs, as opposed to a deterministic algorithm. As the non-deterministic signal can utilize online computation, context specific sub-modules can be applied in the 2nd-pass decoding when a non-deterministic signal is used. The signal can be obtained through online computation and inference, (e.g. iCluster, sCluster, noise-level (SNR), gender/age detection, accent detection.)

Regardless of the external signal(s) used, the controller processes the signals and determines a context. The context can be determined using heuristics or a machine classifier. In one example, machine classifier is trained using contextual training data that can be mapped to contexts of interest. Once trained, the machine classifier can receive unlabeled signal data and assign one or more contexts.

As mentioned, several different contexts can be considered. One context is the gender of the speaker. The gender the speaker can be determined as either male or female.

Another context is the accent of the speaker. Taking English as an example, the speaker could have a British accent, an Irish accent, an Australian accent, an Indian accent or one of several different American accents (e.g., Southern, New York, Chicago, New England). The context can also include several different foreign accents. For example a speaker, could speak English with a German accent, a French accent, a Spanish accent, a Chinese accent, etc.

The context can be scenario specific. People speak differently when performing different tasks. For example, a user may speak differently when dictating a message than when issuing commands Scenario specific contexts can include dictation, queries, voice commands, and such.

The context can be channel specific. Channel specific refers to the communication medium used to capture the audio signal. The communication medium can include the microphones, communication pipelines, data compression, etc. For example, an audio signal captured using Bluetooth technology can differ from an audio signal captured by a microphone embedded in a client device. The audio signal can differ based on the model and settings of the microphone.

The context can be device specific. Different devices can have different audio characteristics because of the combination of hardware and software that forms the device. The device context can be defined by operating system, where all devices running an operating system form a single context. The device context can be defined by form factor, such as PC, smart phone, e-reader, virtual reality headsets, augmented reality, etc. The device context can be model specific, for example, specific model smart phone models could have a model-specific context. These examples could also be combined to form device contexts. For example, a context could be defined by a combination of form factor and operating system, such as tablets running a first operating system. A separate sub-module could be trained for each device context.

The context can be based on ambient noise level. The ambient noise context can include a volume of ambient noise as measured by a signal-to-noise ratio. The ambient noise context can also be based on the type of ambient noise content. For example, the context can be ambient noise comprising music, movies, or television. The ambient noise context could include multiple speakers talking in the background. Different sub-modules could be trained to handle different ambient noise contexts.

The context can be based on iClusters. To compute the iCluster: First, calculate the iVector for each utterance and the loading matrix for iVector extraction. Next, conduct K-means clustering for the iVectors and thus obtain the centroid of each iCluster. Estimate iCluster-specific sub-modules via adaptation and obtain an inventory of iCluster-specific sub-modules. During decoding the controller can calculate the iVector for the testing utterance using the loading matrix and then assign the speech iCluster based on the distance between the ivector and the centroid of the different iClusters. Once an appropriate iCluster sub-module is identified, the iCluster-specific sub-module can be included in the modular model for decoding. Alternatively, the association of client and iCluster can be obtained offline as a deterministic signal for modularization. For example, once calculated in a given context, the appropriate iCluster for a speaker can be selected based on contextual signals.

The context can be based on sClusters. To computer the sCluster the controller can train a speakerID neural network for speaker identification. The last hidden layer bottleneck feature can be extracted as the frame-level vector-space representation. Bottleneck features are generated from a multi-layer perceptron in which one of the internal layers has a small number of hidden units, relative to the size of the other layers. This small layer creates a constriction in the network that forces the information pertinent to classification into a low dimensional representation.

The controller can calculate the utterance-level vector representation via averaging the frame-level representation. The controller can then conduct K-means clustering of the utterance-level vector representation and thus obtain the centroid of each sCluster. In testing, first obtain the frame-level bottleneck feature by forward passing the input feature to the speakerID neural network and calculate the utterance-level bottleneck feature via averaging the frame-level feature, then assign the sCluster based on the distance between the utterance-level speakerID neural network bottleneck feature and the centroid of the different sClusters. Alternatively, the association of client and sCluster can be obtained offline as a deterministic signal for modularization.

The input layer of the modular model can receive features or representations of the audio signal as input. The features can comprise multiple representations extracted during different methods. Exemplary methods include cepstral coefficients, mel-frequency log filter bank features, perceptual linear prediction. Alternatively, the waveform of the speech audio can also be used directly as input features. Each methodology may be used to generate a different set of representations for the audio signal. The input can be a single feature frame or a window of frames. The input layer communicates the input to nodes in a subsequent layer for processing. The subsequent layer performs calculations and provides the input to the next layer.

Computing Environment

Turning now to FIG. 1, among other components not shown, system 100 includes network 110 communicatively coupled to one or more data source(s) 108, storage 106, client devices 102 and 104, and model generator 120. In one aspect, the model is an acoustic model. The model is modular according to the technology described here. For example, in the case of a deep learning model, one or more layers could be modular. The components shown in FIG. 1 may be implemented on or using one or more computing devices, such as computing device 1000 described in connection to FIG. 10. Network 110 may include, without limitation, one or more local area networks (LANs) and/or wide area networks (WANs). Such networking environments are commonplace in offices, enterprise-wide computer networks, intranets, and the Internet. It should be understood that any number of data sources, storage components or data stores, client devices, and model generators may be employed within the system 100 within the scope of the technology described herein. Each may comprise a single device or multiple devices cooperating in a distributed environment. For instance, the model generator 120 may be provided via multiple computing devices or components arranged in a distributed environment that collectively provide the functionality described herein. Additionally, other components not shown may also be included within the network environment.

Example system 100 includes one or more data source(s) 108. Data source(s) 108 comprise data resources for training the models described herein. The data provided by data source(s) 108 may include labeled and un-labeled data, such as transcribed and un-transcribed data. For example, in an embodiment, the data includes one or more phone sets (sounds) and may also include corresponding transcription information or senone labels that may be used for initializing the model and various specialized sub-modules within the model. The training data can include audio of multiple speakers with characteristics that are desirable for training. For example, the training data can include male speakers, female speakers, and speakers with various accents. The training data can also include data for different signal collection scenarios, such as over a Bluetooth speaker. The training data can also include the frequency spectrum for the speech of a single speaker.

In an embodiment, the un-labeled data in data source(s) 108 is provided by one or more deployment-feedback loops. For example, usage data from spoken search queries performed on search engines may be provided as un-transcribed data. Other examples of data sources may include by way of example, and not limitation, various spoken-language audio or image sources including streaming sounds or video, web queries, mobile device camera or audio information, web cam feeds, smart-glasses and smart-watch feeds, customer care systems, security camera feeds, web documents, catalogs, user feeds, SMS logs, instant messaging logs, spoken-word transcripts, gaming system user interactions such as voice commands or captured images (e.g., depth camera images), tweets, chat or video-call records, or social-networking media. Specific data source(s) 108 used may be determined based on the application including whether the data is domain-specific data (e.g., data only related to entertainment systems, for example) or general (non-domain-specific) in nature. Aspects of the technology, may train domain specific sub-modules.

Example system 100 includes client devices 102 and 104, which may comprise any type of computing device where it is desirable to have an automatic speech recognition (ASR) system on the device or interact with a server-based ASR system. For example, in one embodiment, client devices 102 and 104 may be one type of computing device described in relation to FIG. 10 herein. By way of example and not limitation, a user device may be embodied as a personal data assistant (PDA), a mobile device, smartphone, smart watch, smart glasses (or other wearable smart device), augmented reality headset, virtual reality headset, a laptop, a tablet, remote control, entertainment system, vehicle computer system, embedded system controller, appliance, home computer system, security system, consumer electronic device, or other similar electronics device. In one embodiment, the client device is capable of receiving input data such as audio and image information usable by an ASR system described herein that is operating on the device or on a server. For example, the client device may have a microphone or line-in for receiving audio information, a camera for receiving video or image information, or a communication component (e.g., Wi-Fi functionality) for receiving such information from another source, such as the Internet or a data source 108.

Example client devices 102 and 104 are included in system 100 to provide an example environment wherein the modular acoustic model may be deployed. Although it is contemplated that aspects of the model described herein may operate on one or more client devices 102 and 104, it is also contemplated that some embodiments of the technology described herein do not include client devices. For example, modular model may be embodied on a server or in the cloud. Further, although FIG. 1 shows two example client devices, more or fewer devices may be used.

Storage 106 generally stores information including data, computer instructions (e.g., software program instructions, routines, or services), and/or models used in embodiments of the technology described herein. In an embodiment, storage 106 stores data from one or more data source(s) 108, one or more modular models, information for generating and training modular models, and the computer-usable information outputted by one or more modular models. As shown in FIG. 1, storage 106 includes modular models 107 and 109, both with multiple sub-modules. Additional details and examples of modular models are described in connection to FIGS. 2-9. Although depicted as a single data store component for the sake of clarity, storage 106 may be embodied as one or more information stores, including memory on client device 102 or 104, model generator 120, or in the cloud.

Model generator 120 comprises an accessing component 122, a training component 124, and a decoding component 128. The model generator 120, in general, is responsible for generating modular models, including creating new modular models (or adapting existing modular models). The modular models generated by model generator 120 may be deployed on a client device such as device 104 or 102, a server, or other computer system. Model generator 120 and its components 122, 124, and 128 may be embodied as a set of compiled computer instructions or functions, program sub-modules, computer software services, or an arrangement of processes carried out on one or more computer systems, such as computing device 1000, described in connection to FIG. 10, for example. Model generator 120, components 122, 124, and 128, functions performed by these components, or services carried out by these components may be implemented at appropriate abstraction layer(s) such as the operating system layer, application layer, hardware layer, etc., of the computing system(s). Alternatively, or in addition, the functionality of these components, model generator 120, and/or the embodiments of technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Continuing with FIG. 1, accessing component 122 is generally responsible for accessing and providing to model generator 120 training data from one or more data sources 108. In some embodiments, accessing component 122 may access information about a particular client device 102 or 104, such as information regarding the computational and/or storage resources available on the client device. In some embodiments, this information may be used to determine the optimal size of a model generated by model generator 120 for deployment on the particular client device.

Figure 3:
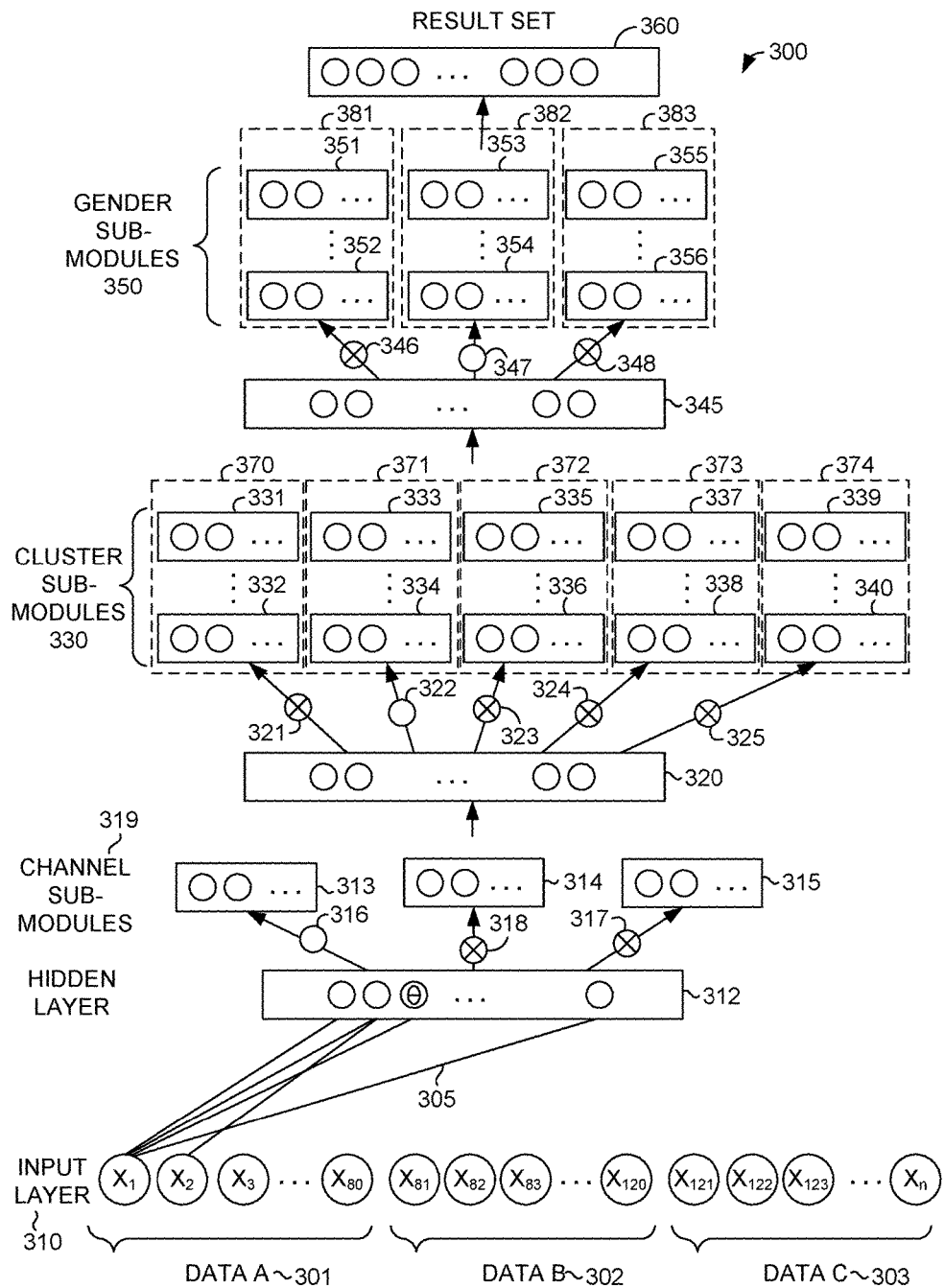
FIG. 3 is a diagram depicting a visual representation of a modular neural network with multiple classes of sub-modules, in accordance with an aspect of the technology described herein.

In one embodiment, a modular model may be embodied as a specific structure of mapped probabilistic relationships of an input onto a set of appropriate outputs, such as illustratively depicted in FIG. 3. The probabilistic relationships (shown as connected lines between the nodes 305 of each layer) may be determined through training. Thus, in some embodiments of the technology described herein, modular model 300 is defined according to its training. (An untrained modular model therefore may be considered to have a different internal structure than the same modular model that has been trained.)

Returning to FIG. 1, the training component 124 assigns parameters to nodes within a modular model. In one aspect, a default or base version of the model is trained using a variety of training data, for example, by pooling data from all specialized contexts. Once the base version is established, specialized sub-modules are trained by holding all other nodes' values constant in the base model and retraining the nodes in the specialized sub-module using context specific data. For example, training data for a female voice may be used to train a sub-module (e.g., one or more layers in a deep-learning model) to more accurately process female voice data. Once retrained, the new sub-module can be used when processing a female voice.

As an initial training step, the training component 124 can train a multi-style deep learning acoustic model by pooling data from all contexts. Once trained the node in the various layers can be associated with variables that are used to process non-training data to assign probabilities that a given acoustic frame should be labeled as an acoustic unit. The model generated by this step can be called a default model. The default model will include universal layers that process data in every context. The nodes in a modular layer can become the default sub-module to be used when a context associated with the modular layer is not determined.

Once the default model is trained, the context-specific sub-modules can be trained using the default sub-modules as a starting point. For example, an accent-specific sub-module, such as for English with a Southern accent, could be trained by re-estimating the default accent-specific sub-module via model adaptation using accent-specific data for English with a Southern accent. This can be accomplished by holding the values constant in the universal layers and in the default sub-module of the other modular layers. Only the node values in the accent-specific sub-module are adjusted. Once adjusted, the retrained sub-module becomes the accent-specific sub-module for English with a Southern accent. The process can be repeated to generate accent-specific sub-modules for different accents.

The process for building gender-specific sub-modules is similar. The default gender-specific sub-module can be re-estimated the default via model adaptation using gender-specific data. Male specific data can be used to build a male voice specific sub-module and female voice data can be used to build a female voice specific sub-module.

The default scenario-specific sub-module can be re-estimated via model adaptation using the scenario-specific data to build scenario-specific sub-modules.

The default channel-specific sub-module can be re-estimated via model adaptation using the channel-specific data to build channel-specific sub-modules.

The default noise-specific sub-module can be re-estimated via model adaptation using the speech at different ambient noise levels to build noise-specific sub-modules.

The default iCluster-specific sub-module can be re-estimated via model adaptation applied to the selected iCluster-specific layers using speech belonging to different iClusters to build iCluster-specific sub-modules.

The default sCluster-specific sub-modules can be re-estimated via model adaptation applied to the selected sCluster-specific sub-modules using speech belonging to different sClusters to build sCluster-specific sub-modules.

The decoding component 128 applies the trained model to categorize audio data. In one aspect, the decoding is generated on a frame-by-frame basis. Alternatively, a result can be calculated for a window of frames using input comprising the frames that make up the window. An average of the estimations from different windows can improve the final estimation result.

As used herein, a sub-module can be a single layer, multiple layers, or a plurality of nodes within one or more layers.

Automatic Speech Recognition System a Modular Mask.

Figure 2:
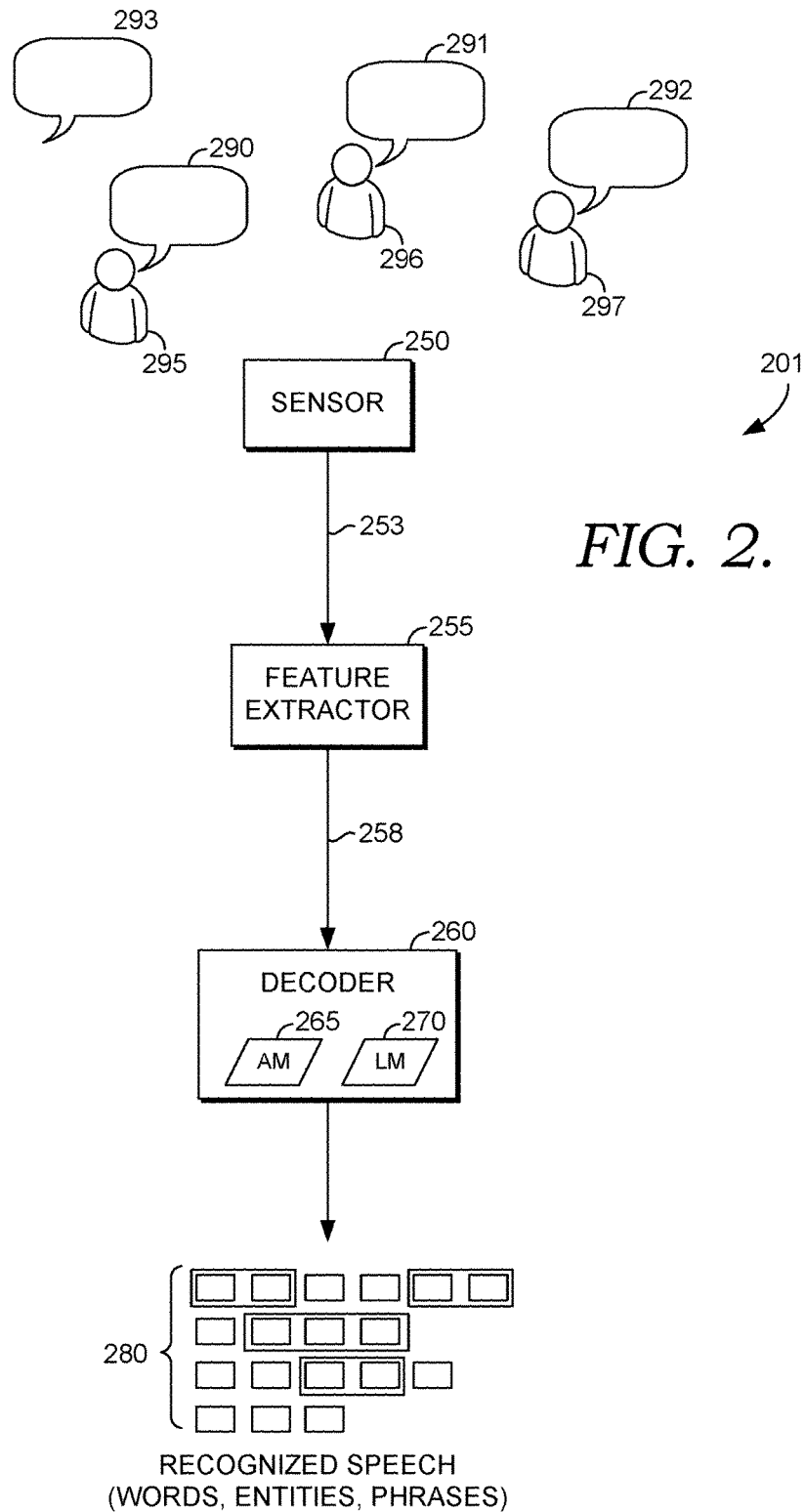
FIG. 2 is a diagram depicting an automatic speech recognition system, in accordance with an aspect of the technology described herein.

Turning now to FIG. 2, an example of an automatic speech recognition (ASR) system 201 is shown according to an embodiment of the technology described herein. The ASR system 201 shown in FIG. 2 is just one example of an ASR system that is suitable for use with a modular model for processing a speech signal that can ultimately be used to understand the speaker's speech. It is contemplated that other variations of ASR systems may be used including ASR systems that include fewer components than the example ASR system shown here, or additional components not shown in FIG. 2. The ASR system can be implemented on a computing device having processor and a memory, such as computing device 1000 described subsequently. The memory can comprise computer executable code that configures the computing device to perform the ASR functions described herein once executed.

The ASR system 201 shows a sensor 250 that senses acoustic information (audibly spoken words or speech 290, 291, 292) provided by user-speakers 295, 296, and 297 respectfully as well as background noise 293. Aspects of the technology described herein can be used in a single speaker environment or the multi-speaker environment shown. The background noise can include music, crowd noise, etc.

Sensor 250 may comprise one or more microphones or acoustic sensors, which may be embodied on a user device (such as client devices 102 or 104, described in FIG. 1). Sensor 250 converts the speech 290, 291, 292, and background noise 293 into acoustic information 253 that may be provided to a feature extractor 255 (or may be provided directly to decoder 260, in some embodiments). In some embodiments, the acoustic information may undergo pre-processing (not shown) before feature extractor 255. Feature extractor 255 generally performs feature analysis to determine the parameterized useful features of the speech signal while reducing noise corruption or otherwise discarding redundant or unwanted information. Feature extractor 255 transforms the acoustic information into features 258 (which may comprise a speech corpus) appropriate for the models used by decoder 260. The features 258 can include features that correspond to the speech 290, 291, 292, and noise 293.

Decoder 260 comprises an acoustic model (AM) 265 and a language model (LM) 270. AM 265 can use a modular model to extract features for individual speakers from the features 258 provided. Once a feature set is generated for each speaker, the AM 265 can process the speaker-specific features to identify acoustic units. The AM 265 comprises statistical representations of distinct sounds that make up a word, which may be assigned a label called an acoustic unit. The AM 265 can assign the labels to sounds. The AM 265 can model the acoustic unit based on the speech features and provides to LM 270 a corpus comprising a sequence of acoustic units together with the scores. The scores can represent a probability or confidence that the acoustic unit is correct. As an alternative, the AM 265 can provide a string of acoustic units to the LM 270. The LM 270 receives the corpus of words, acoustic units, in some instances with associated scores, and determines a recognized speech 280, which may comprise words, entities (classes), or phrases.

In some embodiments, the LM 270 may reflect specific subdomains or certain types of corpora, such as certain classes (e.g., personal names, locations, dates/times, movies, games, etc.), words or dictionaries, phrases, or combinations of these.

Turning now to FIG. 3, a visual representation of a modular neural network model 300 with multiple classes of sub-modules is shown, in accordance with an aspect of the technology described herein. FIG. 3 also shows data sets 301, 302, and 303, which are shown for purposes of understanding, but which are not considered a part of modular model 300. Some layers are shared layers that are used in all deployments of the model, while other layers include multiple class-specific modules only a portion of which are used in any given deployment. The shared layers include the input layer 310, the first shared layer 312, the second shared layer, and the third shared layer 345. The class-specific layers include the channel-specific modularized layer 319, the cluster specific modularized layer 330, and the gender-specific modularized layer 350. Some of the layers are actually several layers deep. The data sets 301, 302, and 303 are passed into an active model configuration, calculations are performed by the different nodes, and a result set 360 is generated.

As used herein, a shared layer comprises nodes and or modules that are all active in all configurations of the modular model. The nodes or modules in a shared layer are trained across multiple scenarios. As used herein, a modularized layer comprises multiple sub-modules at least one of which is not active in a given deployment. The different sub-modules in a modularized layer are each tuned to a different scenario.

The modular model 300 includes an input layer 310. The input layer 310 is a shared layer that includes a plurality of nodes that each correspond to an input type. The nodes may also be described as perceptrons. In one aspect, an audio signal is processed using one or multiple types of feature extraction processes. The features can comprise multiple representations extracted during different methods. Exemplary methods include amplitude modulation spectrograph, relative spectral transform and perceptual linear prediction, mel-frequency, cepstral coefficients, and cochleagram response. Each methodology may be used to generate a different set of representations for the audio signal. For example, the representations may comprise representations associated with different frequency ranges within the audio signal. Each representation can be input to a node trained to receive that type of representation. For example, the nodes $(X_1, X_2, X_3 \ldots X_{80})$ associated with dataset A 301 may be trained to receive features extracted using amplitude modulation spectrograms. The nodes $(X_{81}, X_{82}, X_{83} \ldots X_{120})$ associated with dataset B 302 can be trained to receive features extracted using perceptual linear prediction. The nodes $(X_{121}, X_{122}, X_{123} \ldots X_n)$ associated with dataset C 303 could be trained to receive features generated according to some other method.

The modular model 300 includes multiple hidden layers between the input layer 310 and the top active layer in the gender specific sub-module (351, 353, or 355). The first shared layer 312 is a shared layer that will process data in all configurations of the modular model 300. A shared layer could also be described as universal. The layers each comprise nodes (shown as circles) that perform functions using the input received from nodes in a lower layer. The weights used by a function associated with each node can be established during training. A line connects each node in the input layer 310 to each node in the first shared layer 312. (For the sake of simplicity a line is not shown between each node.) For example, an individual node within the first shared layer 312 can receive input from each node in the input layer 310 and perform a calculation using the input to generate an output. The different nodes may give different weight to different inputs resulting in a different output. The weights and other factors associated with each node that are used to perform a calculation to produce an output are described herein as "node parameters" or just "parameters." The node parameters are learned through training.

The output generated from each node in the first shared layer 312 can be passed to each node into the active sub-module (313, 314, or 315) in the channel-specific sub-module layer 319. The active sub-module in the channel-specific sub-module layer 319 then perform additional calculations using a designated function and generates an output which is passed to the nodes in the second shared layer 320.

The channel-specific sub-module layer 319 is a modularized layer with different sub-modules specially trained to process audio signals received through different communication channels. The channel-specific sub-module layer 319 comprises three different sub-modules 313, 314, and 315. Each sub-module is trained for a specific context. For example, the Bluetooth sub-module 313 can be specialized to handle Bluetooth. The Bluetooth sub-module 313 can be trained using training data captured through a Bluetooth microphone. The embedded sub-module 314 can handle audio data captured by an embedded microphone. The embedded sub-module 314 can be trained using training data captured the embedded microphone. The default sub-module 315 can be used when contextual information is not able to determine channel information. The default sub-module 325 can be trained by pooling training data for multiple channels. The result set generated by the Bluetooth sub-module 313, the embedded sub-module 314, or the default sub-module 315 is passed to the second shared layer 320.

In an aspect, the modular model 300 includes a gate or gates between layers. The gates shown include gate 316 between the first shared layer 312 and the Bluetooth sub-module 313, gate 318 between the first shared layer 312 and the embedded microphone sub-module 314, and the gate 317 between the first shared layer 312 and the default sub-module 315.

Each gate is opened or closed based on an active context that can be determined through analysis of data apart from the model. Gate 316 is depicted as open. Gate 316 would be open when the audio signal was determined to be captured through a Bluetooth device. When a gate is closed, data is not sent from the first shared layer 312 to the sub-module associated with the gate. The goal is to close the gate when a signal associated with a context-specific sub-module is not received. The use of gates allows the number of output layers to be changed dynamically as context changes during analysis, for example, ambient noise levels could change.

Figure 9:
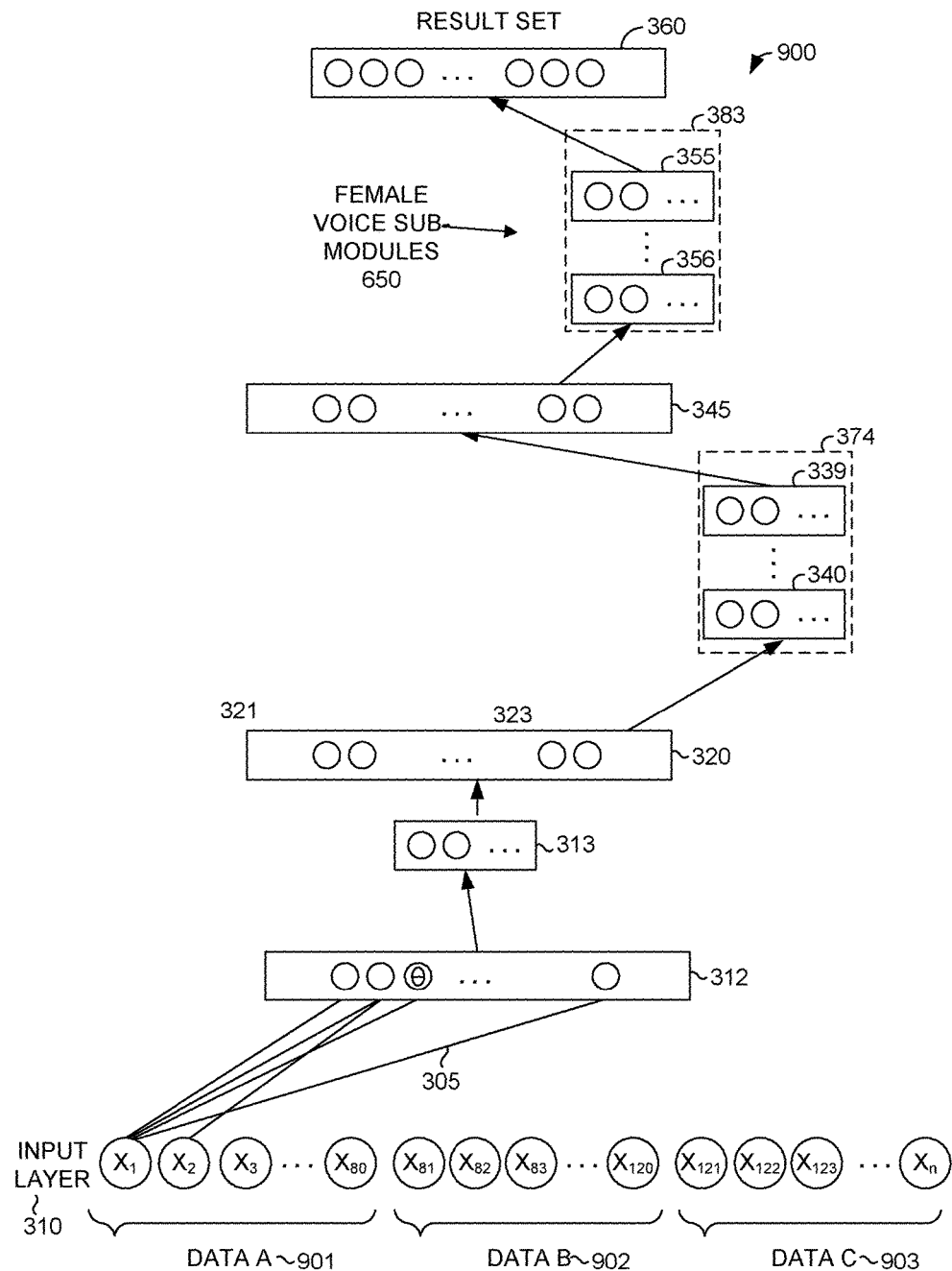
FIG. 9 is a diagram depicting a visual representation of a modular neural network configured by a controller using context information, in accordance with an aspect of the technology described herein.

As an alternative to gates, sub-modules can be swapped in and out of a model so only the context appropriate sub-modules are present to process data. This alternative approach is illustrated in FIG. 9. Context appropriate sub-modules can include default modules when a context relevant to the class of sub-modules has not been determined.

The output from the active sub-module in the channel-specific sub-module layer 319 is passed to the second shared layer 320. The nodes in the second shared layer 320 perform calculations using the output from the channel-specific sub-module layer 319 and generate an output that is passed through open gate 322 into the cluster sub-module 371.

The sub-modules in the cluster specific layer 330 can be activated or deactivated based on the iCluster or sCluster context. In one aspect, each sub-module is associated with a range of iCluster or sCluster values. The appropriate sub-module can be determined by calculating an iCluster value or sCluster value for an acoustic signal being evaluated by the model. In one aspect, iClusters can be used when the utterance is short, such as a query or command In one aspect, sClusters can be used when longer utterances, such as dictation is used. The iCluster and sCluster sub-modules (370, 371, 372, 373, and 374) are each multiple layers deep. For example, iCluster or sCluster could be two layers deep, three layers deep, five layers deep, seven layers deep or similar. Access to the various clusters can be governed by the gates (321, 322, 323, 324, and 325) after determining the context. A first cluster-specific sub-module 370 can comprise an input layer 322 and output layer 331. The first cluster-specific sub-module 370 can include hidden layers between these two layers that are not shown but are instead indicated by three vertical dots. The input layer 322 receives the result from the second shared layer 320, when the gate 321 is open. The result generated by the output layer 331 can be passed to the third shared layer 345. The other sub-modules within the cluster-specific layer 330 work in a similar fashion. The gate 322 allows result data to pass to the input layer 334 of the second cluster-specific sub-module 371. The associated output layer 333 passes information to the third shared layer 345. The gate 323 allows result data to pass to the input layer 336 of the third cluster-specific sub-module 372. The associated output layer 335 passes information to the third shared layer 345. The gate 324 allows result data to pass to the input layer 338 of the fourth cluster-specific sub-module 373. The associated output layer 337 passes information to the third shared layer 345. The gate 325 allows result data to pass to the input layer 340 of the fifth cluster-specific sub-module 374. The associated output layer 339 passes information to the third shared layer 345.

The third shared layer 345 processes the result from the active cluster specific sub-module to generate a result set that is passed to one of the gender-specific sub-modules 350. The gender-specific sub-module are trained to process a male voice, female voice, or a voice of an unknown gender. The 346 gate allows information to pass from the third shared layer 345 to input layer 352 of the male voice sub-module 381. The output layer 351 of the male voice sub-module can generate the final result set 360. The 347 gate (depicted as open) allows information to pass from the third shared layer 345 to input layer 354 of the default sub-module 382. The default voice sub-module 382 can be used when the gender of the voice is unknown. The output layer 353 of the default sub-module can generate the final result set 360. The 348 gate allows information to pass from the third shared layer 345 to input layer 356 of the female voice sub-module 383. The output layer 355 of the female-voice sub-module 383 can generate the final result set 360. It should be noted that the values of result set 360 may differ depending on which sub-module is active for a given processing run. Nevertheless, for the sake of simplicity a single result set is shown As mentioned, the input layer 312 can receive features on a frame-by-frame basis or on a window-of-frames basis. Whatever the unit of input, the result set can use the same units.

Figure 4:
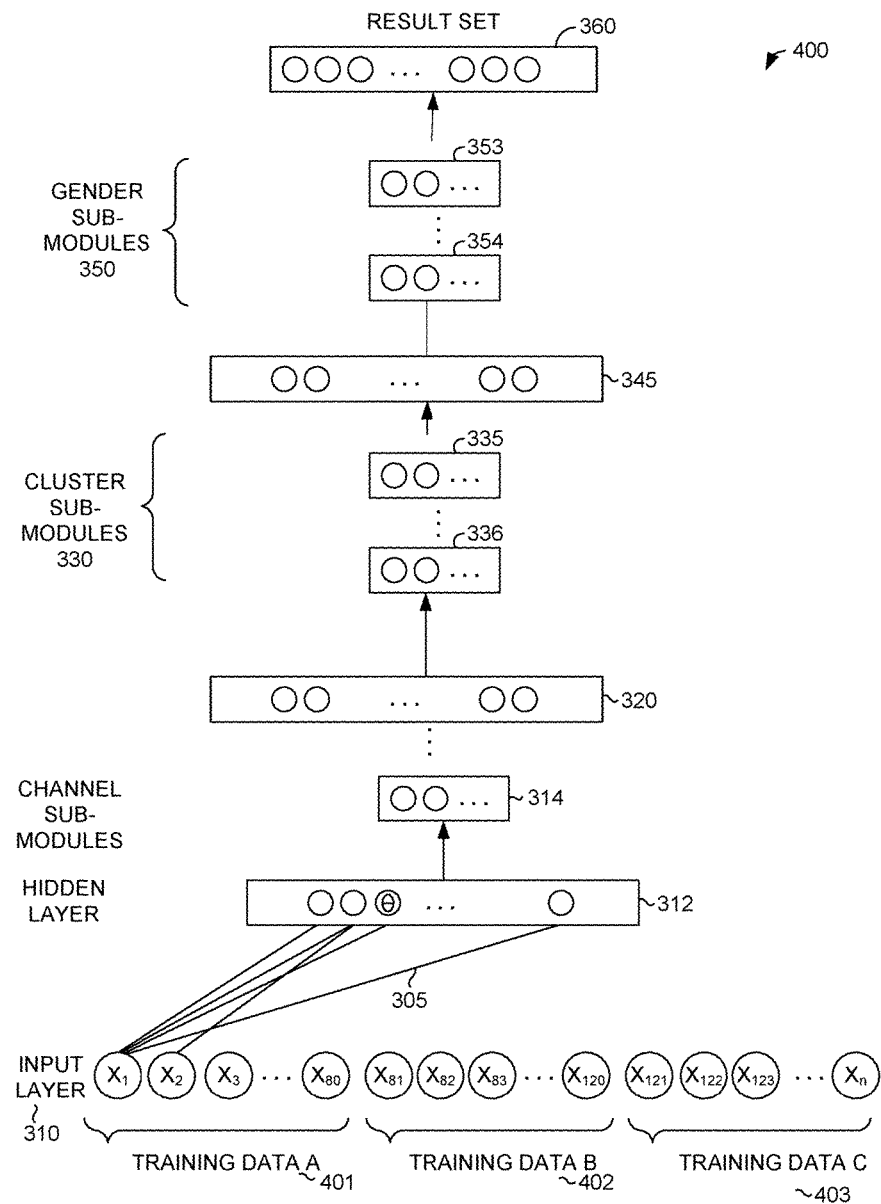
FIG. 4 is a diagram depicting a visual representation of a base version of a modular neural network with multiple classes of sub-modules, in accordance with an aspect of the technology described herein.
Figure 5:
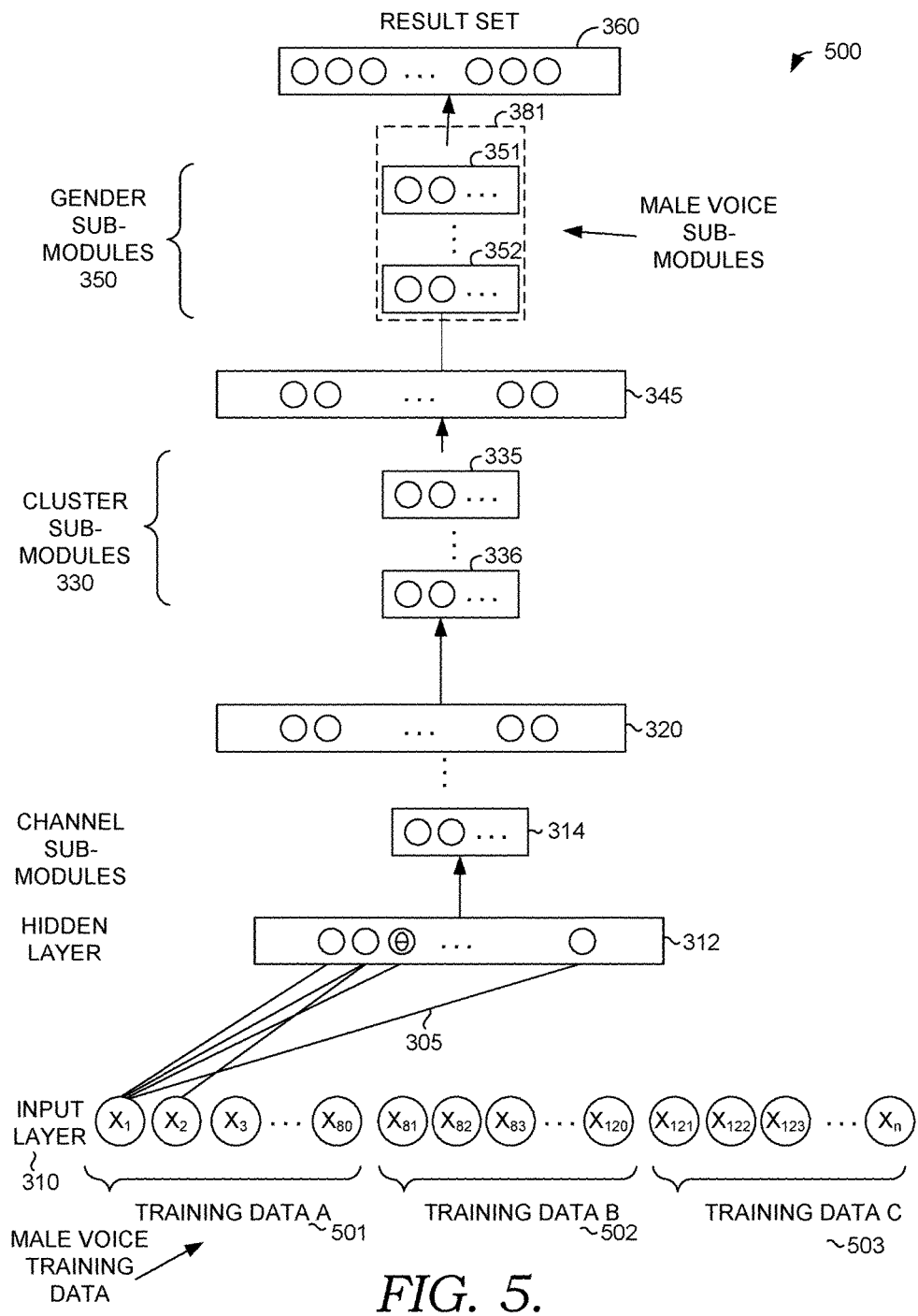
FIG. 5 is a diagram depicting a visual representation of training a male-voice specific sub-module for use with a modular neural network with, in accordance with an aspect of the technology described herein.
Figure 6:
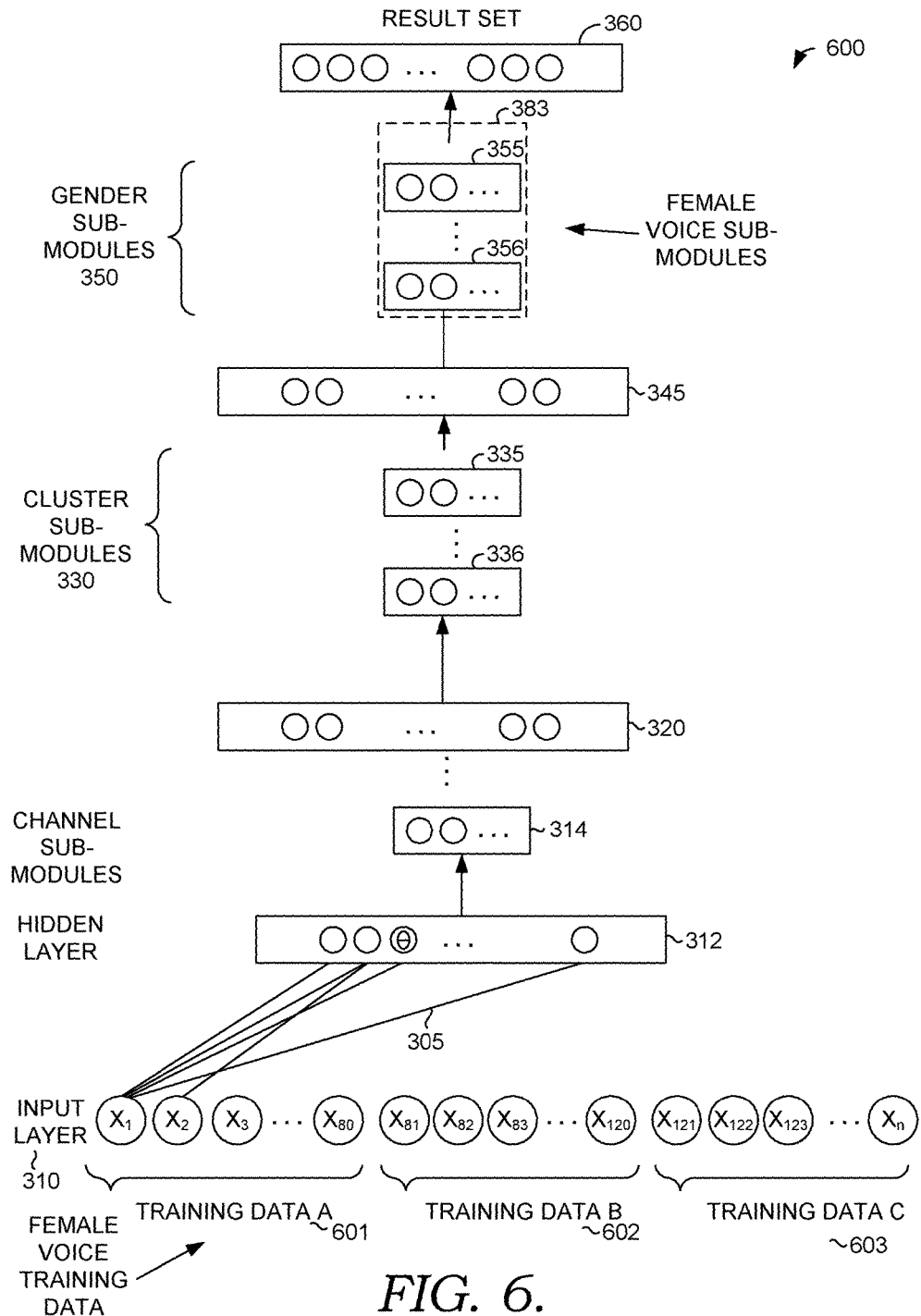
FIG. 6 is a diagram depicting a visual representation of training a female-voice specific sub-module for use with a modular neural network with, in accordance with an aspect of the technology described herein.

FIGS. 4-6 illustrate how the modular model can be trained. Initially a default version of the model 400 can be trained by pooling context-specific training data 401, 402, and 403. The sub-modules in the default model 400 can form the shared layers (312, 320, and 345) that will process data in all scenarios, and default sub-modules (314, 336, 335, 353, and 354) that are used when the context associated with the class of sub-module is not determined. The default model 400 can then be used to build context-specific sub-modules.

FIG. 5. illustrates training the male-voice specific sub-module 381. The male-voice specific sub-module 381 comprises input layer 352 and output layer 351. The sub-module 381 can include additional layers that are not shown. The layers in the male-voice specific sub-module 381 can be trained by holding the values constant in all other sub-modules and layers originally trained to form the default model 400 and then retraining layers in the default voice specific module 382 using male voice specific input data 501, 502, and 503 to form male-voice specific sub-module 381, including input layer 352 and output layer 351.

FIG. 6. illustrates training the female-voice specific sub-module 383. The female-voice specific sub-module 383 comprises input layer 356 and output layer 355. The sub-module 383 can include additional layers that are not shown. The layers in the female-voice specific sub-module 383 can be trained by holding the values constant in all other sub-modules and layers originally trained in the default model 400 and then retraining the default voice-specific module 382 using male voice specific input data 601, 602, and 603, to form the female-voice specific sub-module 383.

Figure 7:
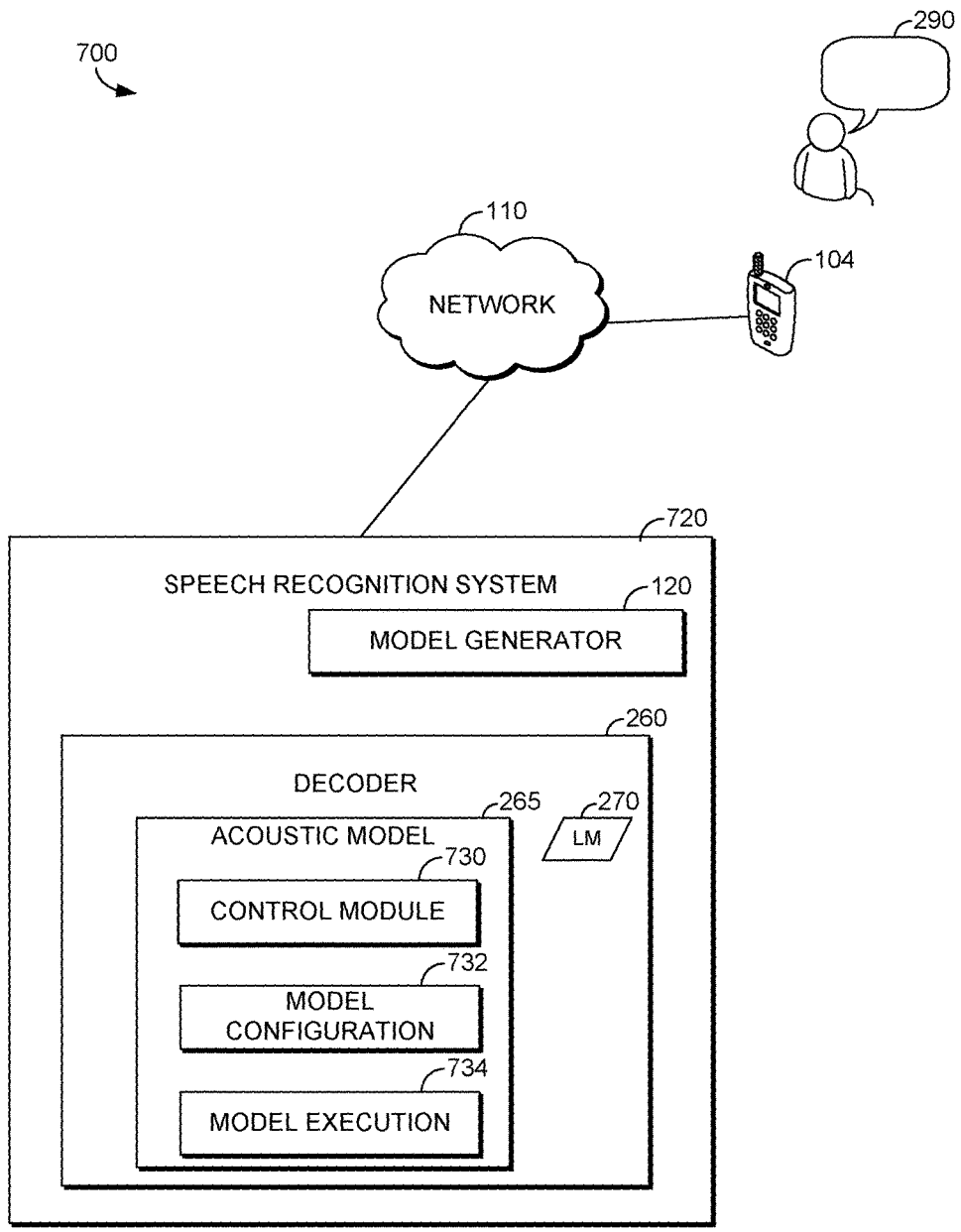
FIG. 7 is a diagram depicting an automatic speech recognition system comprising a modular acoustic model, in accordance with an aspect of the technology described herein.

Turning now to FIG. 7, details of the acoustic model 265 described previously with reference to FIG. 2 are provided in the context of a speech recognition system 720. The acoustic model 265 includes a control module 730, a model configuration component 732, and a model execution component 734.

The control module 730 receives external signal data and determines the context of the acoustic information. For example, the control module 730 could determine from context that the audio signal captures a female voice. The control module 730 could activate a sub-module specially trained to process female voices, instead of a default sub-module, or a sub-module trained to process male voices. Different combinations of specialized sub-modules can be activated simultaneously. For example, a modularized model could include a sub-module specialized for a female speaker, a sub-module for a specific accent, and a sub-module for dictating a message (a type of scenario).

In one aspect, the control module 730 receives external signals to understand the context and initialize the relevant sub-modules. The external signals can be discrete or continuous. Discrete signals can define a context based on a one-time determination that is unlikely to change during the signal processing session. Discrete signals can include enumerative signals, such as gender (female, male etc.), scenario (voice search, short message dictation etc.), channel (mobile, Bluetooth, desktop etc.) etc. The discrete signals can be derived from user profile information, device context, signal analysis, etc.

The discrete signals can also include clustered signals, such as iCluster (e.g. speech signal clustering based on iVector representation), sCluster (e.g. speech signal clustering based on speakerID neural network bottleneck feature representation) etc.

In addition to the discrete signals, continuous signals can be monitored to determine the context. The continuous signals can be either scalar signals or vector signals. The scalar signals can be a single value, such as an integer. The vector signals can comprise multiple variables, each with an assigned value.

As an alternative to discrete or continuous signals, the external signals can be alternatively classified into deterministic or non-deterministic. As the deterministic signal is available before recognizing the utterance, sub-modules can be applied in the 1st-pass decoding. The signal can be obtained through user or system setting (user check non-native box, user check male/female box; system set microphone type, Bluetooth connection, modularization user ID (MUID), location, etc.). The deterministic signal can also be inferred. For example, a detected location change at 60 mile/hr can be used to infer a driving mode. A name/phonebook/search history can be used to infer a gender/age. A GPS data signal can be used to activate a location dependent sub-module.

The signal can also be processed using a nondeterministic algorithm. A nondeterministic algorithm is an algorithm that, even for the same input, can exhibit different behaviors on different runs, as opposed to a deterministic algorithm. As the non-deterministic signal can use online computation, context specific sub-modules can be applied in the 2nd-pass decoding. The signal can be obtained through online computation and inference, (e.g. iCluster, sCluster, noise-level (SNR), gender/age detection, accent detection.)

Regardless of the external signal(s) used, the control sub-module 730 processes the signals and determines a context. The context can be determined using heuristics or a machine classifier. In one example, a machine classifier is trained using contextual training data that can be mapped to contexts of interest. Once trained the machine classifier can receive unlabeled signal data and assign one or more contexts, which can be used to activate or deactivate different sub-modules in the modularized model.

As mentioned, several different contexts can be considered. One context is the gender of the speaker. The gender the speaker can be determined as either male or female.

Another context is the accent of the speaker. Taking English as an example, the speaker could have a British accent, an Irish accent, an Australian accent, an Indian accent or one of several different American accents (e.g., Southern, New York, Chicago, New England). The context can also include several different foreign accents. For example a speaker, could speak English with a German accent, a French accent, a Spanish accent, a Chinese accent, etc.

The context can be scenario specific. People speak differently when performing different tasks. For example, a user may speak differently when dictating a message than when issuing commands Scenario specific context can include dictation, queries, voice commands, and such.

The context can be channel specific. Channel specific refers to the combination of hardware and software technology used to capture the audio signal. For example, an audio signal captured using Bluetooth technology can differ from an audio signal captured by a microphone embedded in a client device. The audio signal can differ based on the model and settings of the microphone.

The context can be device specific. Different devices can have different audio characteristics because of the combination of hardware and software that forms the device. The device context can be defined by operating system, where all devices running an operating system form a single context. The device context can be defined by form factor, such as PC, smart phone, e-reader, virtual reality headsets, augmented reality, etc. The device context can be model specific, for example, specific model smart phone models could have a model-specific context. These examples could also be combined to form device contexts. For example, a context could be defined by a combination of form factor and operating system, such as tablets running a first operating system. A separate sub-module could be trained for each device context.

The context can be based on ambient noise level. The ambient noise context can include a volume of ambient noise as measured by a signal-to-noise ratio. The ambient noise context can also be based on the type of ambient noise content. For example, the context can be ambient noise comprising music, movies, or television. The ambient noise context could include multiple speakers talking in the background. Different sub-modules could be trained to handle different ambient noise contexts.

The context can be based on iClusters. To compute the iCluster: First, calculate the iVector for each utterance and the loading matrix for iVector extraction. Next, conduct K-means clustering for the iVectors and thus obtain the centroid of each iCluster. Estimate iCluster-specific sub-modules via adaptation and obtain an inventory of iCluster-specific sub-modules. During decoding the controller can calculate the iVector for the testing utterance using the loading matrix and then assign the speech iCluster based on the distance between the iVector and the centroid of the different iClusters. Once an appropriate iCluster sub-module is identified, the iCluster-specific sub-module can be included in the modular model for decoding. Alternatively, the association of client and iCluster can be obtained offline as a deterministic signal for modularization. For example, once calculated in a given context, the appropriate iCluster for a speaker can be selected based on contextual signals.

The context can be based on sClusters. To compute the sCluster the controller can train a speakerID neural network for speaker identification. The last hidden layer bottleneck feature can be extracted as the frame-level vector-space representation. Bottleneck features are generated from a multi-layer perceptron in which one of the internal layers has a small number of hidden units, relative to the size of the other layers. This small layer creates a constriction in the network that forces the information pertinent to classification into a low dimensional representation.

The control module 730 can calculate the utterance-level vector representation via averaging the frame-level representation. The control module 730 can then conduct K-means clustering of the utterance-level vector representation and thus obtain the centroid of each sCluster. In testing, the frame-level bottleneck feature can be obtained first by forward passing the input feature to the speakerID neural network and calculate the utterance-level bottleneck feature via averaging the frame-level feature, then assign the sCluster based on the distance between the utterance-level speakerID neural network bottleneck feature and the centroid of the different sClusters. Alternatively, the association of client and sCluster can be obtained offline as a deterministic signal for modularization.

The model configuration component 732 takes the context determined by the control module 730 and generates a suitable modular model. In one aspect, a modular model is initialized by selecting relevant context specific sub-modules for inclusion in each modularized layer. Where a context is not available for a particular modularized layer a default sub-module could be used. This type of modular model would only include one sub-module per layer and would not require gates. The appearance of this type of modular model would resemble the context-specific modular model 900 shown in FIG. 9. As can be seen, model 900 comprises Bluetooth specific sub-module 313, a default cluster sub-module 374 comprising layers 339 and 340, and the female-voice specific sub-module 383. The modular model 900 also includes the common layers and is shown processing input data 901, 902, and 903. The execution component 734 can provide the signal data 901, 902, and 903 for processing and collect a result set that is then sent to the language model 270.

Figure 8:
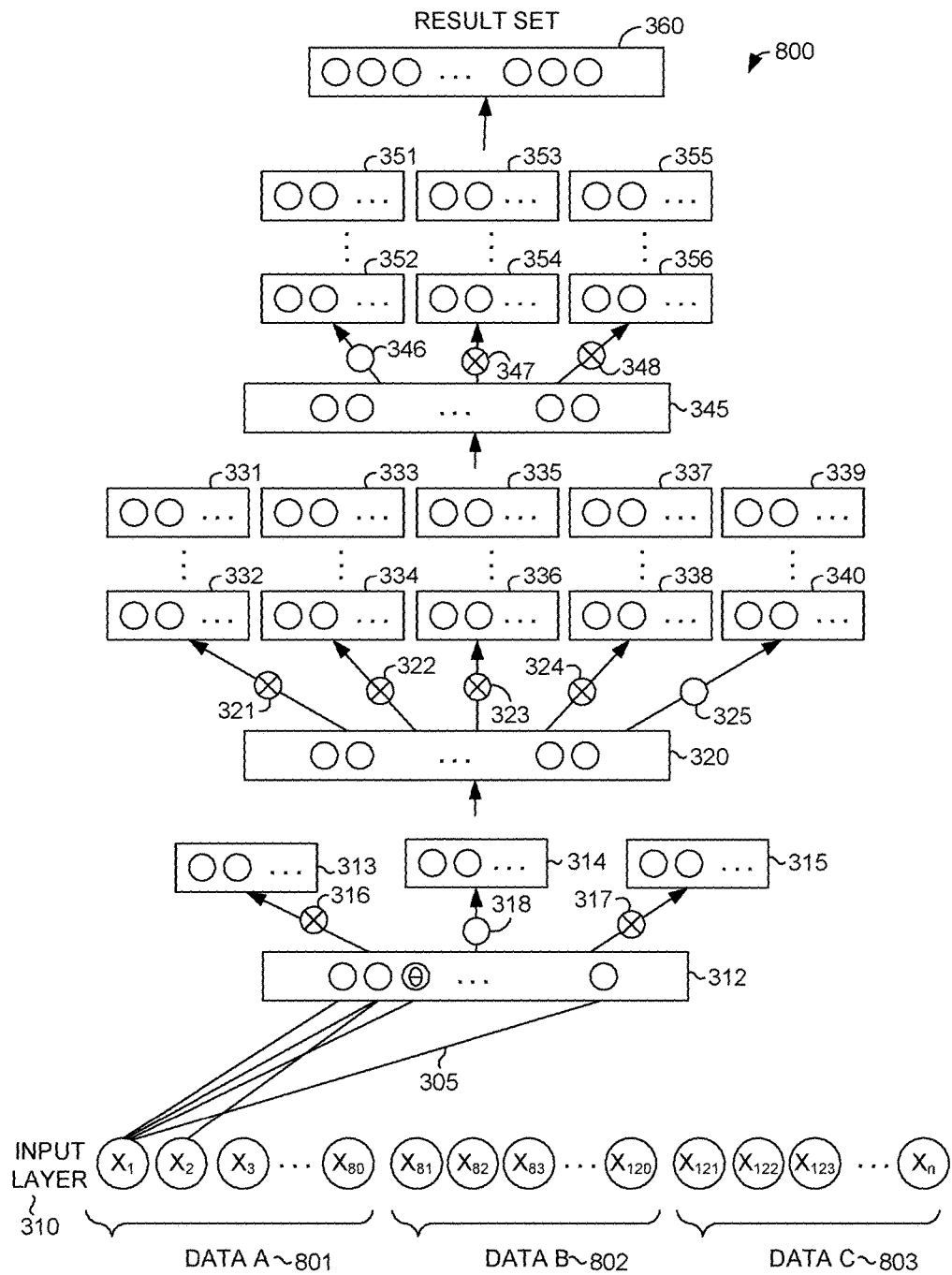
FIG. 8 is a diagram depicting a visual representation of a modular neural network configured by a controller using context information, in accordance with an aspect of the technology described herein.

In another aspect, the model configuration component 732 configures a context specific modular model by opening and closing relevant gates as illustrated in FIG. 8. The content-specific model 800 of FIG. 8 includes all of the components shown in the modular model 300. However, different gates have been opened or closed to configure the model 800 to a specific context that is different from the context of the model 300. Specifically gate 318, gate 325, and gate 346 are open to allow their respective sub-modules to process data. Given the same data as input, the model 800 should produce a different result set 360 from the model 300 because different sub-modules with different parameters are processing data. All other gates are closed and the sub-modules and layers associated with those gates will not process data or contribute to a final result set 360. It should be noted the gates can take the form of code that directs traffic within the neural network.

Figure 11:
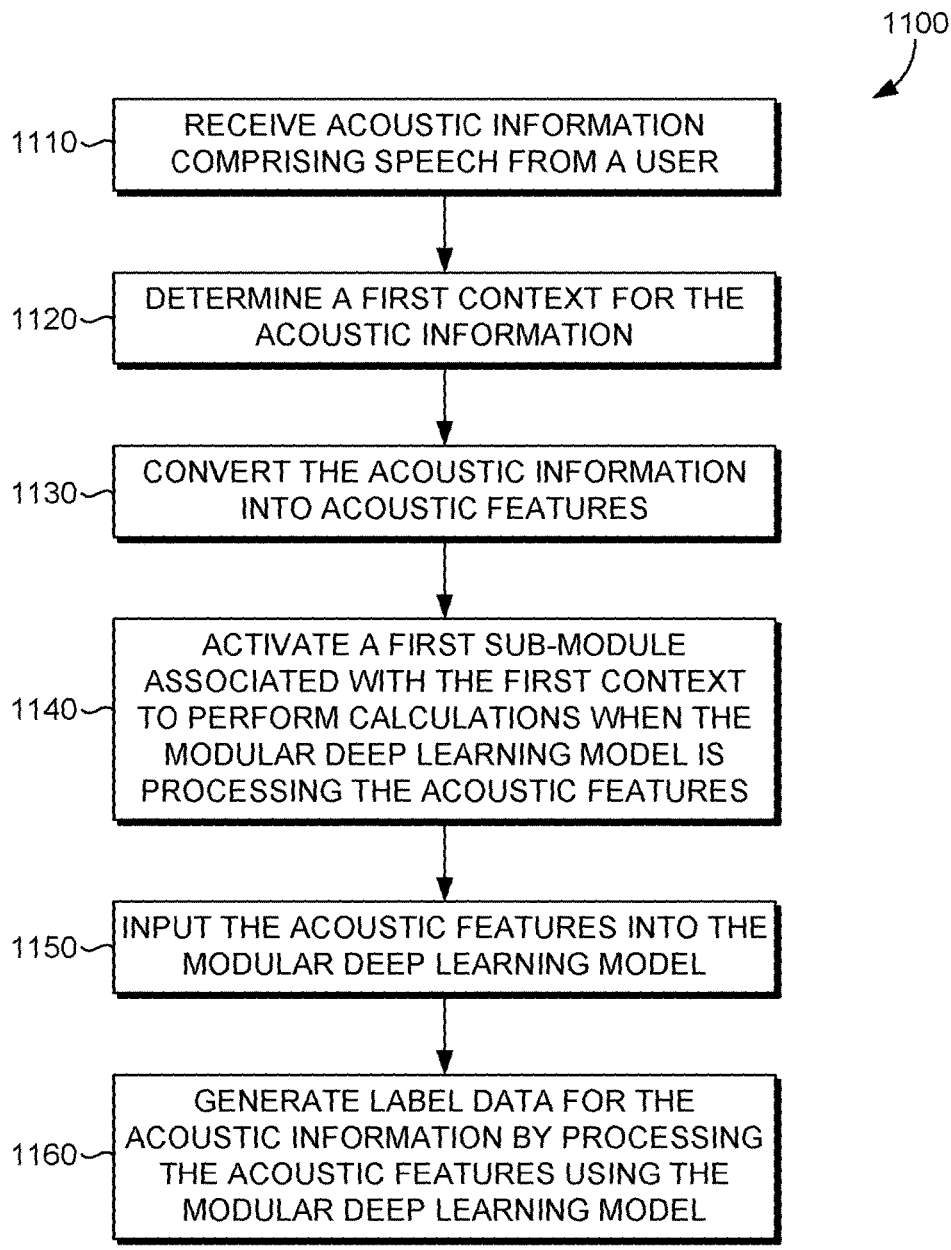
FIG. 11 depicts a flow chart showing a method of labeling sounds using a modular deep learning model according to aspects of the technology described herein.

Turning now to FIG. 11, a method 1100 of labeling sounds using a modular deep learning model is provided, according to an aspect of the technology described herein. The method 1100 could be performed as part of a process used by an acoustic model to label sound or acoustic data for use by a language model to identify human speech. Accordingly, the method 1100 could be performed by a computing device, such as computing device 1000 described previously.

At step 1110, acoustic information comprising speech from a user is received. Sounds including human speech can be captured by a client device as described previously with reference to FIG. 2. The sensors and associated hardware used to capture the sounds can convert the sounds to acoustic information.

At step 1120, a first context for the acoustic information is determined. The context can be determined by analyzing signals apart from the acoustic information. For example, information about a phone that captures an audio signal could be used to determine the likely gender of the speaker, accent of the speaker, area of the country, etc. The information about the speaker could be used to initialize a modular model with sub-modules specially adapted to process speech matching these context characteristics. Using the special purpose sub-modules can improve the accuracy of the model.

A controller can be provided that identifies the context and activates or deactivates different sub-modules within the modular model. For example, the controller could determine from context that the audio signal captures a female voice. The controller could activate a sub-module specially trained to process female voices, instead of a default sub-module, or a sub-module trained to process male voices. Different combinations of specialized sub-modules can be activated simultaneously. For example, a model could include a sub-module specialized for a female speaker with a specific accent attempting to dictate a message (a type of scenario).

In one aspect, the controller receives external signals to understand the context and initialize the relevant sub-modules. The external signals can be discrete or continuous. Discrete signals can define a context based on a one-time determination that is unlikely to change during the signal processing session. Discrete signals can include enumerative signals, such as gender (female, male etc.), scenario (voice search, short message dictation etc.), channel (mobile, Bluetooth, desktop etc.) etc. The discrete signals can be derived from user profile information, device context, signal analysis, etc.

The discrete signals can also include clustered signals, such as iCluster (e.g. speech signal clustering based on iVector representation), sCluster (e.g. speech signal clustering based on speakerID neural network bottleneck feature representation) etc. iVector speech representation maps the variable length speech signal to a fixed length vector via factor analysis in the total variability space. The variability space is defined by the total variability matrix that contains the eigenvectors with the largest eigenvalues of the total variability covariance matrix. The iVector speech representation contains multiple variabilities of the speech signal, such as speaker, channel, etc. iCluster is a speech clustering methodology based on the iVector speech representation and K-means clustering. The sCluster is a speech clustering methodology based on the speakerID deep neural network bottleneck representation and K-means clustering.

In addition to the discrete signals, continuous signals can be monitored to determine the context. The continuous signals can be either scalar signals or vector signals. The scalar signals can be a single value, such as an integer. The vector signals can comprise multiple variables, each with an assigned value.

Regardless of the external signal(s) used, the controller processes the signals and determines a context. The context can be determined using heuristics or a machine classifier. In one example, machine classifier is trained using contextual training data that can be mapped to contexts of interest. Once trained, the machine classifier can receive unlabeled signal data and assign one or more contexts.

As mentioned, several different contexts can be considered. One context is the gender of the speaker. The gender the speaker can be determined as either male or female.

Another context is the accent of the speaker. Taking English as an example, the speaker could have a British accent, an Irish accent, an Australian accent, an Indian accent or one of several different American accents (e.g., Southern, New York, Chicago, New England). The context can also include several different foreign accents. For example a speaker, could speak English with a German accent, a French accent, a Spanish accent, a Chinese accent, etc.

The context can be scenario specific. People speak differently when performing different tasks. For example, a user may speak differently when dictating a message than when issuing commands Scenario specific contexts can include dictation, queries, voice commands, and such.

The context can be channel specific. Channel specific refers to the combination of hardware and software technology used to capture the audio signal. For example, an audio signal captured using Bluetooth technology can differ from an audio signal captured by a microphone embedded in a client device. The audio signal can differ based on the model and settings of the microphone.

The context can be device specific. Different devices can have different audio characteristics because of the combination of hardware and software that forms the device. The device context can be defined by operating system, where all devices running an operating system form a single context. The device context can be defined by form factor, such as PC, smart phone, e-reader, virtual reality headsets, augmented reality, etc. The device context can be model specific, for example, specific model smart phone models could have a model-specific context. These examples could also be combined to form device contexts. For example, a context could be defined by a combination of form factor and operating system, such as tablets running a first operating system. A separate sub-module could be trained for each device context.

The context can be based on ambient noise level. The ambient noise context can include a volume of ambient noise as measured by a signal-to-noise ratio. The ambient noise context can also be based on the type of ambient noise content. For example, the context can be ambient noise comprising music, movies, or television. The ambient noise context could include multiple speakers talking in the background. Different sub-modules could be trained to handle different ambient noise contexts.

The context can be based on iClusters. To compute the iCluster: First, calculate the iVector for each utterance and the loading matrix for iVector extraction. Next, conduct K-means clustering for the iVectors and thus obtain the centroid of each iCluster. Estimate iCluster-specific sub-modules via adaptation and obtain an inventory of iCluster-specific sub-modules. During decoding the controller can calculate the iVector for the testing utterance using the loading matrix and then assign the speech iCluster based on the distance between the ivector and the centroid of the different iClusters. Once an appropriate iCluster sub-module is identified, the iCluster-specific sub-module can be included in the modular model for decoding. Alternatively, the association of client and iCluster can be obtained offline as a deterministic signal for modularization. For example, once calculated in a given context, the appropriate iCluster for a speaker can be selected based on contextual signals.

The context can be based on sClusters. To computer the sCluster the controller can train a speakerID neural network for speaker identification. The last hidden layer bottleneck feature can be extracted as the frame-level vector-space representation. Bottleneck features are generated from a multi-layer perceptron in which one of the internal layers has a small number of hidden units, relative to the size of the other layers. This small layer creates a constriction in the network that forces the information pertinent to classification into a low dimensional representation.

The controller can calculate the utterance-level vector representation via averaging the frame-level representation. The controller can then conduct K-means clustering of the utterance-level vector representation and thus obtain the centroid of each sCluster. In testing, first obtain the frame-level bottleneck feature by forward passing the input feature to the speakerID neural network and calculate the utterance-level bottleneck feature via averaging the frame-level feature, then assign the sCluster based on the distance between the utterance-level speakerID neural network bottleneck feature and the centroid of the different sClusters. Alternatively, the association of client and sCluster can be obtained offline as a deterministic signal for modularization.

At step 1130, the acoustic information is converted into acoustic features. The features can comprise multiple representations extracted during different methods. Exemplary methods include amplitude modulation spectrograph, relative spectral transform and perceptual linear prediction, mel-frequency, cepstral coefficients, and cochleagram response. Alternatively, the waveform of the speech audio can also be used directly as input features. Each methodology may be used to generate a different set of representations for the audio signal. For example, the representations may comprise representations associated with different frequency ranges within the audio signal.

At step 1140, a first sub-module associated with the first context is activated to perform calculations when the modular deep learning model is processing the acoustic features. The modular model can be a deep learning based acoustic model. A deep learning based acoustic model comprises a stack of different types of neural network layers (e.g. fully connected layers, convolution layers, long short term memory cell layer) or their combination. The layers can be organized in a feed-forward or recurrent network structure. The sub-modules of a deep learning based acoustic model can be used to represent distinct non-phonetic acoustic factors, such as accent origins (e.g. native, non-native), speech channels (e.g. mobile, Bluetooth, desktop etc.), speech application scenario (e.g. voice search, short message dictation etc.), and speaker variation (e.g. individual speakers or clustered speakers), etc. Along with existing sub-modules, the technology described herein can also insert additional neural network sub-modules and use them to parameterize and optimize the specific non-phonetic acoustic conditions. Overall, many of the neural network components are shared across acoustic conditions except a few specific sub-modules that are adapted to specific acoustic conditions.

The first sub-module can be activated by opening a gate that allows data output from a preceding layer to be input into the first sub-module. Gates associated with other sub-modules in the same context class could be closed. A context class is a training feature, such as voice gender. Within the voice gender class a sub-module could be present for a male voice, a female voice, and a default or undetermined gender.

In another aspect, the sub-module is activated by including the sub-module in the modular model as the model is instantiated for processing the audio features. In this example, the modular model only includes shared modules, default modules where context information is not available for a context class, and context-specific modules when a context is known. Gates are not needed because only one module per context class is included in the model.

The sub-modules can be trained by holding a baseline version of the module nodes constant and then retraining a context-specific module using context-specific input data. Accordingly, as an initial training step, a baseline modular deep learning acoustic model can be trained by pooling data from all contexts. Once trained the node in the various layers can be associated with variables that are used to process non-training data to assign probabilities that a given acoustic frame should be labeled as an acoustic unit. The model generated by this step can be called a default model. The default model will include universal layers that process data in every context. The nodes in a modular layer can become the default sub-module to be used when a context associated with the modular layer is not determined.

Once the default model is trained, the context-specific sub-modules can be trained using the default sub-modules as a starting point. For example, an accent-specific sub-module, such as for English with a Southern accent, could be trained by re-estimating the default accent-specific sub-module via model adaptation using accent-specific data for English with a Southern accent. This can be accomplished by holding the values constant in the universal layers and in the default sub-module of the other modular layers. Only the node values in the accent-specific sub-module are adjusted. Once adjusted, the retrained sub-module becomes the accent-specific sub-module for English with a Southern accent. The process can be repeated to generate accent-specific sub-modules for different accents.

The process for building gender-specific sub-modules is similar. The default gender-specific sub-module can be re-estimated the default via model adaptation using gender-specific data. Male specific data can be used to build a male voice specific sub-module and female voice data can be used to build a female voice specific sub-module.

The default scenario-specific sub-module can be re-estimated via model adaptation using the scenario-specific data to build scenario-specific sub-modules.

The default channel-specific sub-module can be re-estimated via model adaptation using the channel-specific data to build channel-specific sub-modules.

The default noise-specific sub-module can be re-estimated via model adaptation using the speech at different ambient noise levels to build noise-specific sub-modules.

The default iCluster-specific sub-module can be re-estimated via model adaptation applied to the selected iCluster-specific layers using speech belonging to different iClusters to build iCluster-specific sub-modules.

The default sCluster-specific sub-modules can be re-estimated via model adaptation applied to the selected sCluster-specific sub-modules using speech belonging to different sClusters to build sCluster-specific sub-modules.

At step 1150, the acoustic features are input into the modular deep learning model. The features can be input into the input layer. Each node in the input layer can be adapted to receive a particular feature.

At step 1160, label data for the acoustic information is generated by processing the acoustic features using the modular deep learning model. The input layer transfers the received input to the lowest hidden layer of the modular deep learning model. Each hidden layer of the modular deep learning model performs calculations according the function associated with each node and the parameters set during training. The output set forms the label data, which can be passed to a language model. Each acoustic unit could be assigned a score or scores associated with different classifications. In other words, a single acoustic unit could be assigned three different possible classifications each with a different confidence score. This output can then be processed to determine a probability of different language sequences.

Figure 12:
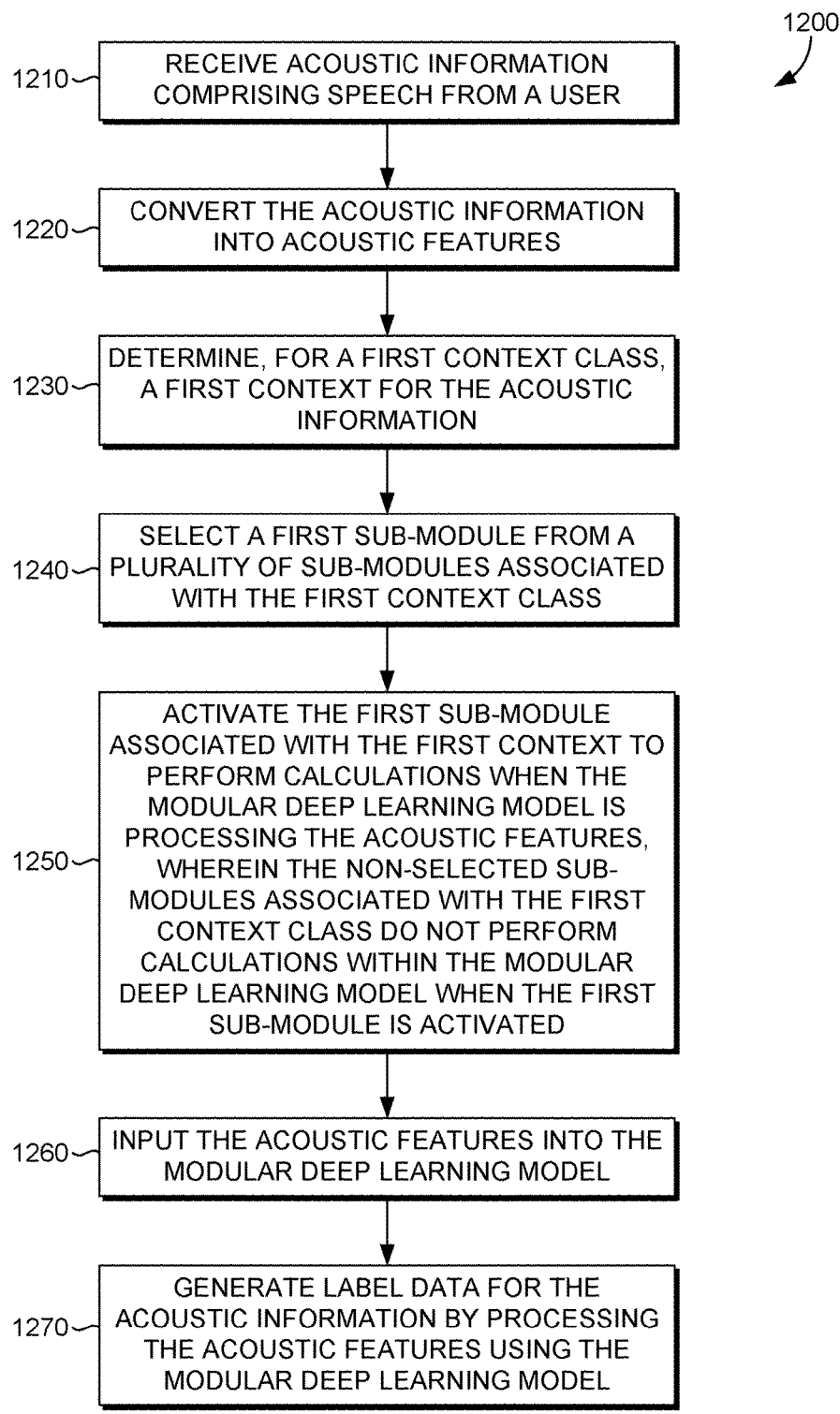
FIG. 12 depicts a flow chart showing a method of labeling sounds using a modular deep learning model according to aspects of the technology described herein.

Turning now to FIG. 12, a method 1200 of labeling sounds using a modular deep learning model is provided. The method 1100 could be performed as part of a process used by an acoustic model to label sound or acoustic data for use by a language model to identify human speech. Accordingly, the method 1100 could be performed by a computing device, such as computing device 1000 described previously.

At step 1210, acoustic information comprising speech from a user is received. Sounds including human speech can be captured by a client device as described previously with reference to FIG. 2. The sensors and associated hardware used to capture the sounds can convert the sounds to acoustic information.

At step 1220, the acoustic information is converted into acoustic features. The features can comprise multiple representations extracted during different methods. Exemplary methods include amplitude modulation spectrograph, relative spectral transform and perceptual linear prediction, mel-frequency, cepstral coefficients, and cochleagram response. Alternatively, the waveform of the speech audio can also be used directly as input features. Each methodology may be used to generate a different set of representations for the audio signal. For example, the representations may comprise representations associated with different frequency ranges within the audio signal.

At step 1230, a determination is made, for a first context class, that the acoustic information is associated with a first context. Each context class can be associated with several context specific sub-modules. For example, the class could be voice gender and the class could include a male voice sub-module, a female voice sub-module, and a default sub-module. The context can be determined by analyzing signals apart from the acoustic information. For example, information about a phone that captures an audio signal could be used to determine the likely gender of the speaker, accent of the speaker, area of the country, etc. The information about the speaker could be used to initialize a modular model with sub-modules specially adapted to process speech matching these context characteristics. Using the special purpose sub-modules can improve the accuracy of the model.

A controller can be provided that identifies the context and activates or deactivates different sub-modules within the modular model. For example, the controller could determine from context that the audio signal captures a female voice. The controller could activate a sub-module specially trained to process female voices, instead of a default sub-module, or a sub-module trained to process male voices. Different combinations of specialized sub-modules can be activated simultaneously. For example, a model could include a sub-module specialized for a female speaker with a specific accent attempting to dictate a message (a type of scenario).

In one aspect, the controller receives external signals to understand the context and initialize the relevant sub-modules. The external signals can be discrete or continuous. Discrete signals can define a context based on a one-time determination that is unlikely to change during the signal processing session. Discrete signals can include enumerative signals, such as gender (female, male etc.), scenario (voice search, short message dictation etc.), channel (mobile, Bluetooth, desktop etc.) etc. The discrete signals can be derived from user profile information, device context, signal analysis, etc.

The discrete signals can also include clustered signals, such as iCluster (e.g. speech signal clustering based on iVector representation), sCluster (e.g. speech signal clustering based on speakerID neural network bottleneck feature representation) etc. iVector speech representation maps the variable length speech signal to a fixed length vector via factor analysis in the total variability space. The variability space is defined by the total variability matrix that contains the eigenvectors with the largest eigenvalues of the total variability covariance matrix. The iVector speech representation contains multiple variabilities of the speech signal, such as speaker, channel, etc. iCluster is a speech clustering methodology based on the iVector speech representation and K-means clustering. The sCluster is a speech clustering methodology based on the speakerID deep neural network bottleneck representation and K-means clustering.

In addition to the discrete signals, continuous signals can be monitored to determine the context. The continuous signals can be either scalar signals or vector signals. The scalar signals can be a single value, such as an integer. The vector signals can comprise multiple variables, each with an assigned value.

Regardless of the external signal(s) used, the controller processes the signals and determines a context. The context can be determined using heuristics or a machine classifier. In one example, machine classifier is trained using contextual training data that can be mapped to contexts of interest. Once trained, the machine classifier can receive unlabeled signal data and assign one or more contexts.

As mentioned, several different contexts can be considered. One context is the gender of the speaker. The gender the speaker can be determined as either male or female.

Another context is the accent of the speaker. Taking English as an example, the speaker could have a British accent, an Irish accent, an Australian accent, an Indian accent or one of several different American accents (e.g., Southern, New York, Chicago, New England). The context can also include several different foreign accents. For example a speaker, could speak English with a German accent, a French accent, a Spanish accent, a Chinese accent, etc.

The context can be scenario specific. People speak differently when performing different tasks. For example, a user may speak differently when dictating a message than when issuing commands Scenario specific contexts can include dictation, queries, voice commands, and such.

The context can be channel specific. Channel specific refers to the combination of hardware and software technology used to capture the audio signal. For example, an audio signal captured using Bluetooth technology can differ from an audio signal captured by a microphone embedded in a client device. The audio signal can differ based on the model and settings of the microphone.

The context can be device specific. Different devices can have different audio characteristics because of the combination of hardware and software that forms the device. The device context can be defined by operating system, where all devices running an operating system form a single context. The device context can be defined by form factor, such as PC, smart phone, e-reader, virtual reality headsets, augmented reality, etc. The device context can be model specific, for example, specific model smart phone models could have a model-specific context. These examples could also be combined to form device contexts. For example, a context could be defined by a combination of form factor and operating system, such as tablets running a first operating system. A separate sub-module could be trained for each device context.

The context can be based on ambient noise level. The ambient noise context can include a volume of ambient noise as measured by a signal-to-noise ratio. The ambient noise context can also be based on the type of ambient noise content. For example, the context can be ambient noise comprising music, movies, or television. The ambient noise context could include multiple speakers talking in the background. Different sub-modules could be trained to handle different ambient noise contexts.

The context can be based on iClusters. To compute the iCluster: First, calculate the iVector for each utterance and the loading matrix for iVector extraction. Next, conduct K-means clustering for the iVectors and thus obtain the centroid of each iCluster. Estimate iCluster-specific sub-modules via adaptation and obtain an inventory of iCluster-specific sub-modules. During decoding the controller can calculate the iVector for the testing utterance using the loading matrix and then assign the speech iCluster based on the distance between the ivector and the centroid of the different iClusters. Once an appropriate iCluster sub-module is identified, the iCluster-specific sub-module can be included in the modular model for decoding. Alternatively, the association of client and iCluster can be obtained offline as a deterministic signal for modularization. For example, once calculated in a given context, the appropriate iCluster for a speaker can be selected based on contextual signals.

The context can be based on sClusters. To computer the sCluster the controller can train a speakerID neural network for speaker identification. The last hidden layer bottleneck feature can be extracted as the frame-level vector-space representation. Bottleneck features are generated from a multi-layer perceptron in which one of the internal layers has a small number of hidden units, relative to the size of the other layers. This small layer creates a constriction in the network that forces the information pertinent to classification into a low dimensional representation.

The controller can calculate the utterance-level vector representation via averaging the frame-level representation. The controller can then conduct K-means clustering of the utterance-level vector representation and thus obtain the centroid of each sCluster. In testing, first obtain the frame-level bottleneck feature by forward passing the input feature to the speakerID neural network and calculate the utterance-level bottleneck feature via averaging the frame-level feature, then assign the sCluster based on the distance between the utterance-level speakerID neural network bottleneck feature and the centroid of the different sClusters. Alternatively, the association of client and sCluster can be obtained offline as a deterministic signal for modularization.

The sub-modules can be trained by holding a baseline version of the module nodes constant and then retraining a context-specific module using context-specific input data. Accordingly, as an initial training step, a baseline modular deep learning acoustic model can be trained by pooling data from all contexts. Once trained the node in the various layers can be associated with variables that are used to process non-training data to assign probabilities that a given acoustic frame should be labeled as an acoustic unit. The model generated by this step can be called a default model. The default model will include universal layers that process data in every context. The nodes in a modular layer can become the default sub-module to be used when a context associated with the modular layer is not determined.

Once the default model is trained, the context-specific sub-modules can be trained using the default sub-modules as a starting point. For example, an accent-specific sub-module, such as for English with a Southern accent, could be trained by re-estimating the default accent-specific sub-module via model adaptation using accent-specific data for English with a Southern accent. This can be accomplished by holding the values constant in the universal layers and in the default sub-module of the other modular layers. Only the node values in the accent-specific sub-module are adjusted. Once adjusted, the retrained sub-module becomes the accent-specific sub-module for English with a Southern accent. The process can be repeated to generate accent-specific sub-modules for different accents.

The process for building gender-specific sub-modules is similar. The default gender-specific sub-module can be re-estimated the default via model adaptation using gender-specific data. Male specific data can be used to build a male voice specific sub-module and female voice data can be used to build a female voice specific sub-module.

The default scenario-specific sub-module can be re-estimated via model adaptation using the scenario-specific data to build scenario-specific sub-modules.

The default channel-specific sub-module can be re-estimated via model adaptation using the channel-specific data to build channel-specific sub-modules.

The default noise-specific sub-module can be re-estimated via model adaptation using the speech at different ambient noise levels to build noise-specific sub-modules.

The default iCluster-specific sub-module can be re-estimated via model adaptation applied to the selected iCluster-specific layers using speech belonging to different iClusters to build iCluster-specific sub-modules.

The default sCluster-specific sub-modules can be re-estimated via model adaptation applied to the selected sCluster-specific sub-modules using speech belonging to different sClusters to build sCluster-specific sub-modules.

At step 1240, a first sub-module from a plurality of sub-modules associated with the first context class is selected. As mentioned, each sub-module in the class is associated with a context. The context determination can be made using the same schema as used to label each sub-module. In other words, the context determination can be constrained to results that match the available sub-modules.

At step 1250, the first sub-module associated with the first context is activated to perform calculations when the modular deep learning model is processing the acoustic features. The non-selected sub-modules associated with the first context class do not perform calculations within the modular deep learning model when the first sub-module is activated. In other words, if the context indicates a male voice, the male-voice sub-module would be activated and female and default sub-modules would not be activated.

The first sub-module can be activated by opening a gate that allows data output from a preceding layer to be input into the first sub-module. Gates associated with other sub-modules in the same context class could be closed. A context class is a training feature, such as voice gender. Within the voice gender class a sub-module could be present for a male voice, a female voice, and a default or undetermined gender.

In another aspect, the sub-module is activated by including the sub-module in the modular model as the model is instantiated for processing the audio features. In this example, the modular model only includes shared modules, default modules where context information is not available for a context class, and context-specific modules when a context is known. Gates are not needed because only one module per context class is included in the model.

At step 1260, the acoustic features are input into the modular deep learning model. The features can be input into the input layer. Each node in the input layer can be adapted to receive a particular feature.

At step 1270, label data for the acoustic information is generated by processing the acoustic features using the modular deep learning model. The input layer transfers the received input to the lowest hidden layer of the modular deep learning model. Each hidden layer of the modular deep learning model performs calculations according the function associated with each node and the parameters set during training. The output set forms the label data, which can be passed to a language model. Each acoustic unit could be assigned a score or scores associated with different classifications. In other words, a single acoustic unit could be assigned three different possible classifications each with a different confidence score. This output can then be processed to determine a probability of different language sequences.

Exemplary Operating Environment

Figure 10:
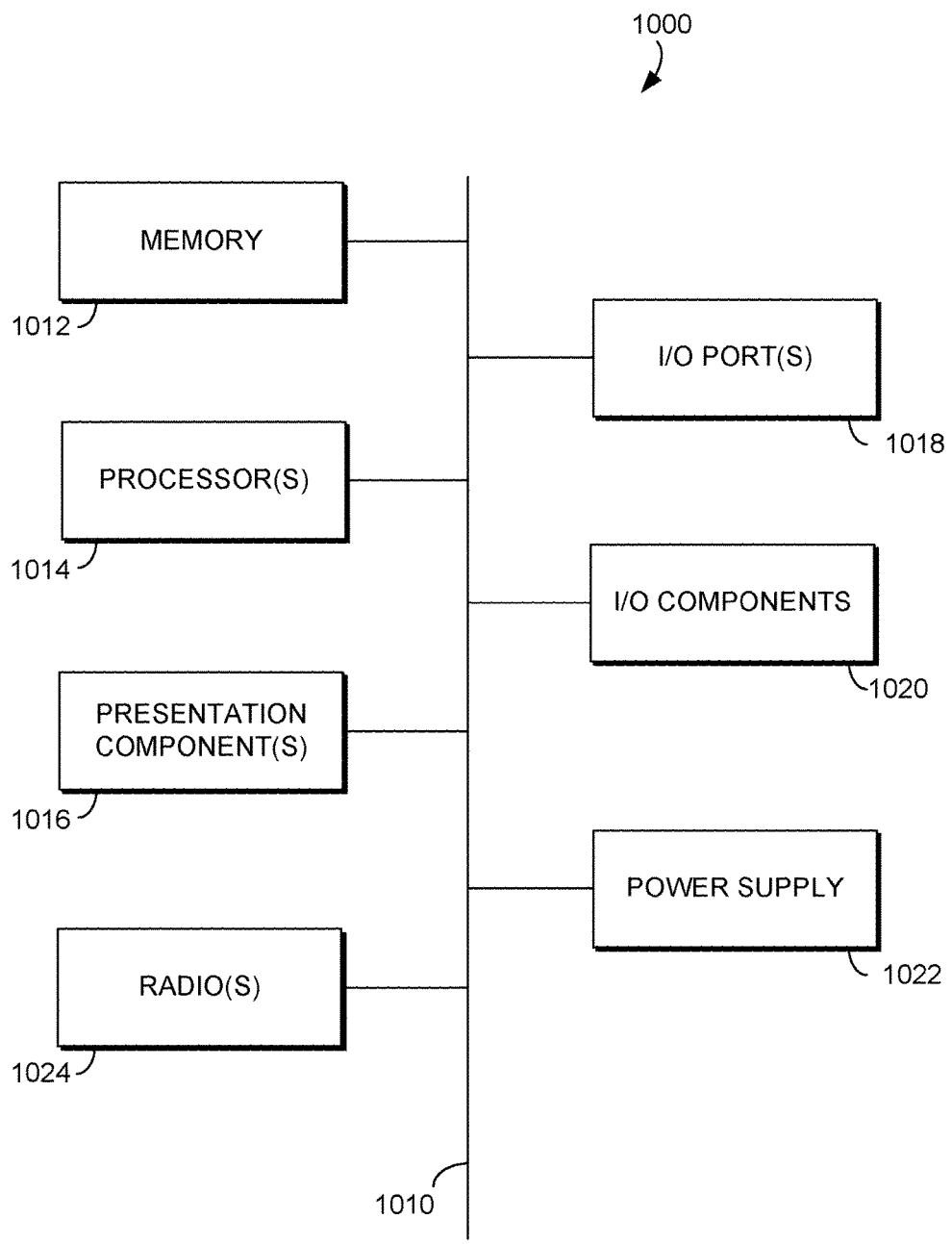
FIG. 10 is a block diagram of an exemplary computing environment suitable for implementing aspects of the technology described herein.

Referring to the drawings in general, and initially to FIG. 10 in particular, an exemplary operating environment for implementing aspects of the technology described herein is shown and designated generally as computing device 1000. Computing device 1000 is but one example of a suitable computing environment and is not intended to suggest any limitation as to the scope of use or functionality of the technology described herein. Neither should the computing device 1000 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 10, computing device 1000 includes a bus 1010 that directly or indirectly couples the following devices: memory 1012, one or more processors 1014, one or more presentation components 1016, input/output (I/O) ports 1018, I/O components 1020, and an illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 10 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 10 and refer to "computer" or "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1012 includes computer storage media in the form of volatile and/or nonvolatile memory. The memory 1012 may be removable, non-removable, or a combination thereof. Exemplary memory includes solid-state memory, hard drives, optical-disc drives, etc. Computing device 1000 includes one or more processors 1014 that read data from various entities such as bus 1010, memory 1012, or I/O components 1020. Presentation component(s) 1016 present data indications to a user or other device. Exemplary presentation components 1016 include a display device, speaker, printing component, vibrating component, etc. I/O ports 1018 allow computing device 1000 to be logically coupled to other devices including I/O components 1020, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In embodiments, a pen digitizer (not shown) and accompanying input instrument (also not shown but which may include, by way of example only, a pen or a stylus) are provided in order to digitally capture freehand user input. The connection between the pen digitizer and processor(s) 1014 may be direct or via a coupling utilizing a serial port, parallel port, and/or other interface and/or system bus known in the art. Furthermore, the digitizer input component may be a component separated from an output component such as a display device, or in some embodiments, the usable input area of a digitizer may be coextensive with the display area of a display device, integrated with the display device, or may exist as a separate device overlaying or otherwise appended to a display device. Any and all such variations, and any combination thereof, are contemplated to be within the scope of embodiments of the technology described herein.

An NUI processes air gestures, voice, or other physiological inputs generated by a user. Appropriate NUI inputs may be interpreted as ink strokes for presentation in association with the computing device 1000. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 1000. The computing device 1000 may be equipped with depth cameras, such as stereoscopic camera systems, infrared camera systems, RGB camera systems, and combinations of these, for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

A computing device may include a radio 1024. The radio 1024 transmits and receives radio communications. The computing device may be a wireless terminal adapted to receive communications and media over various wireless networks. Computing device 1000 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

Embodiments

Aspects of the technology described herein have been described to be illustrative rather than restrictive. It will be understood that certain features and subcombinations are of utility and may be employed without reference to other features and subcombinations. This is contemplated by and is within the scope of the claims.

The invention claimed is:

1. An automatic speech recognition (ASR) system for machine understanding of acoustic information, the system comprising:
one or more processors that receive acoustic information comprising speech from a user received by a computing device associated with the user;

a computer-storage media storing an acoustic model configured to identify acoustic units within an acoustic information, wherein the acoustic model (AM) comprises a modular deep learning model comprising multiple hidden layers, the multiple hidden layers including multiple modular layers comprising multiple context-specific sub-modules, wherein each modular layer is associated with a different context, wherein only a first context-specific sub-module associated with an active context in an individual modular layer processes the acoustic information during ASR, wherein the modular deep learning model also includes one or more common layers between individual modular layers;

a control module comprising one or more computer-storage media storing computer-usable instructions which, when executed by one or more processors, operates to use one or more external signals to determine the active context of the acoustic information when performing ASR;

a model configuration component comprising one or more computer-storage media storing computer-usable instructions which, when executed by one or more processors, operates to configure the acoustic model by activating and deactivating different context-specific sub-modules in the modular deep learning model during ASR based on the active context determined by the control module; and one or more processors that determine recognized speech for the acoustic information, the recognized speech comprising one or more of words, entities, or phrases, by processing acoustic features of the acoustic information using the modular deep learning model.

2. The system of claim 1, wherein the control module activates the first context-specific sub-module.

3. The system of claim 1, wherein the modular deep learning model comprises a gate that opens to allow output from a previous layer to be input to the first context-specific sub-module.

4. The system of claim 1, wherein the first context is the acoustic information being recorded by a Bluetooth microphone and the first context-specific sub-module is trained using acoustic data captured on a Bluetooth microphone.

5. The system of claim 1, wherein the first context is for the acoustic information having an sCluster value within a first range and the first context-specific sub-module is trained using acoustic data having sCluster values within the first range.

6. The system of claim 1, wherein the first context is for the acoustic information having an iCluster value within a first range and the first context-specific sub-module is trained using acoustic data having iCluster values within the first range.

7. The system of claim 1, wherein each of the multiple context-specific layers is trained to different context classes.

8. The system of claim 1, wherein configure the acoustic model comprises activate the first context-specific sub-module in the individual modular layer.

9. A method of labeling sounds using a modular deep learning model for automatic speech recognition (ASR), the method comprising:

receiving acoustic information comprising speech from a user received by a computing device associated with the user;

during ASR of the speech from the user, configuring the modular deep learning model by activating and deactivating different context-specific sub-modules in the modular deep learning model, comprising:

determining that a gender specific context for the acoustic information should be active by analyzing user profile information for the computing device that received the speech from the user, converting the acoustic information into acoustic features, activating a first sub-module associated with the gender specific context to perform calculations when the modular deep learning model is processing the acoustic features, determining a second context for the acoustic information by analyzing the acoustic features, selecting a second sub-module from a plurality of sub-modules associated with a second context class, activating a second sub-module associated with the second context to perform calculations when the modular deep learning model is processing the acoustic features, and inputting the acoustic features into an input layer of the modular deep learning model; and generating label data for the acoustic information by processing the acoustic features using the modular deep learning model including the first sub-module and the second-sub module and one or more common layers between the first sub-module and the second sub-module.

10. The method of claim 9, wherein the context is a sCluster value calculated for the acoustic information.

11. The method of claim 9, wherein the context is an iCluster value calculated for the acoustic information.

12. The method of claim 9, wherein the context is derived from either an external signal or the acoustic information.

13. The method of claim 9, wherein the method further comprises determining an additional context for the acoustic information and activating an additional sub-module associated with the additional context to perform calculations when the modular deep learning model is processing the acoustic information.

14. The method of claim 9, wherein the sub-module forms an entire hidden layer within the modular deep learning model.

15. The method of claim 9, wherein the modular deep learning model comprises a shared layer that performs calculations in all implementations of the modular deep learning model regardless of a context.

16. A computer-storage hardware media comprising computer-executable instructions embodied thereon that when executed by a computing device cause the computer device to perform a method of labeling sounds using a modular deep learning model during automatic speech recognition (ASR), the method comprising:

receiving acoustic information comprising speech from a user received by a client device associated with the user; converting the acoustic information into acoustic features;

during ASR of the speech from the user, configuring the modular deep learning model by activating and deactivating different context-specific sub-modules in the modular deep learning model, comprising:

determining, for a first context class, a first context for the acoustic information, selecting a first sub-module from a plurality of sub-modules associated with the first context class, activating the first sub-module associated with the first context to perform calculations when the modular deep learning model is processing the acoustic features, wherein the non-selected sub-modules associated with the first context class do not perform calculations within the modular deep learning model when the first sub-module is activated, determining, for a second context class, a second context for the acoustic information, selecting a second sub-module from a plurality of sub-modules associated with the second context class, activating the second sub-module associated with the second context to perform calculations when the modular deep learning model is processing the acoustic features, wherein the non-selected sub-modules associated with the second context class do not perform calculations within the modular deep learning model when the second sub-module is activated, and inputting the acoustic features into the modular deep learning model; and generating label data for the acoustic information by processing the acoustic features using the modular deep learning model.

17. The hardware media of claim 16, wherein the modular deep learning model comprises a shared layer that performs calculations in all implementations of the modular deep learning model regardless of a context.

18. The hardware media of claim 16, wherein the sub-module forms an entire hidden layer within the modular deep learning model.

19. The hardware media of claim 16, wherein the sub-module forms multiple hidden layers within the modular deep learning model.

20. The hardware media of claim 16, wherein the first context is a sCluster value calculated for the acoustic information.

* * * * *